(12) United States Patent
Cordery et al.

(10) Patent No.: US 7,386,518 B2
(45) Date of Patent: Jun. 10, 2008

(54) METHOD AND SYSTEM FOR FACILITATING TRANSACTIONS

(75) Inventors: Robert A. Cordery, Danbury, CT (US); Christopher C. Lang, Madison, WI (US); Brian M. Romansky, Monroe, CT (US); Anand V. Chhatpar, Madison, WI (US); Thomas J. Foth, Trumbull, CT (US); Matthew J. Campagna, Ridgefield, CT (US); Jill Boncek, Bridgeport, CT (US)

(73) Assignee: Pitney Bowes Inc., Stamford, CT (US)

( * ) Notice: Subject to any disclaimer, the term of this patent is extended or adjusted under 35 U.S.C. 154(b) by 493 days.

(21) Appl. No.: 10/737,385

(22) Filed: Dec. 16, 2003

(65) Prior Publication Data

US 2005/0131839 A1 Jun. 16, 2005

(51) Int. Cl.
*G06Q 99/00* (2006.01)
(52) U.S. Cl. .............................. 705/78; 726/12; 726/13; 726/15; 726/18; 726/19; 726/21; 705/66; 705/67; 705/75; 705/76; 713/150; 713/153; 713/155; 713/182; 713/186
(58) Field of Classification Search ............. 705/50–80; 713/150, 153, 155, 182–186, 200–202; 706/917; 726/11–21
See application file for complete search history.

(56) References Cited

U.S. PATENT DOCUMENTS 6,363,357 B1 * 3/2002 Rosenberg et al. ............ 705/26
7,096,204 B1 * 8/2006 Chen et al. .................... 705/74
2001/0039535 A1 * 11/2001 Tsiounis et al. ............... 705/71
2003/0233305 A1 * 12/2003 Solomon ...................... 705/37

FOREIGN PATENT DOCUMENTS

WO WO 01/35355 5/2001

OTHER PUBLICATIONS

Bickmore et al., Mar. 31-Apr. 5"Relational Agents: A Model and Implementation of Building User Trust", CHI 2001, vol. No. 3, Issue No. 1.*

* cited by examiner

*Primary Examiner*—Jalatee Worjloh
(74) *Attorney, Agent, or Firm*—Ronald Reichman; Angelo N. Chaclas

(57) ABSTRACT

A system for facilitating a transaction between a first party and a second party is controlled by a trusted third party system and is programmed to carry out the method by receiving the first party's instructions for fulfilling at least a part of the first party's obligations in said transaction. The system communicates with the second party and provides the second party with perceptible assurance that the second party is in communication with a trusted third party system through the system. The system transmits information to the second party to provide assurance that the first party's instructions have been or will be fulfilled. Thus trust in the third party is transferred to the first party and the second party can trust that the first party's obligations have been or will be fulfilled.

49 Claims, 19 Drawing Sheets

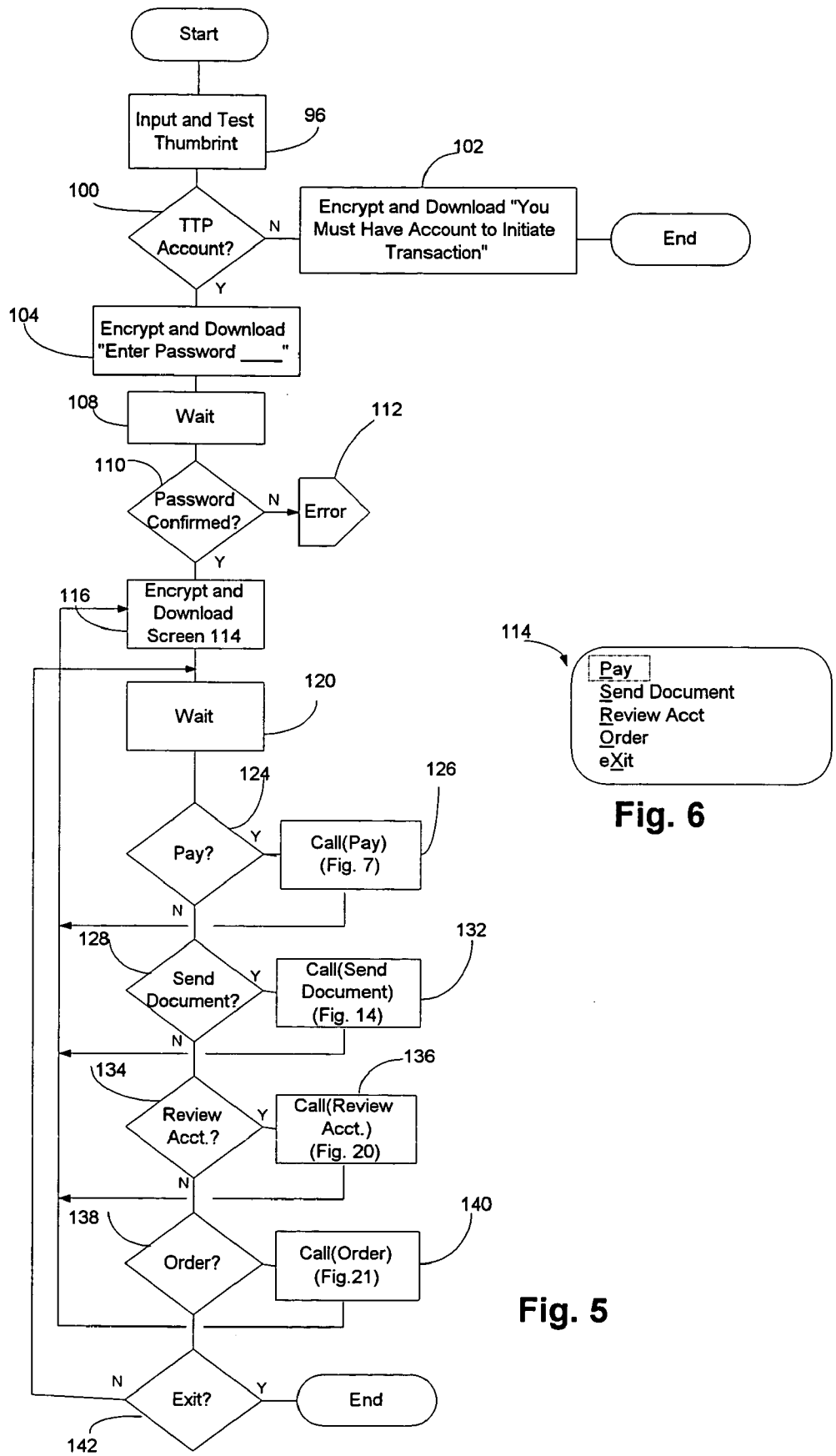

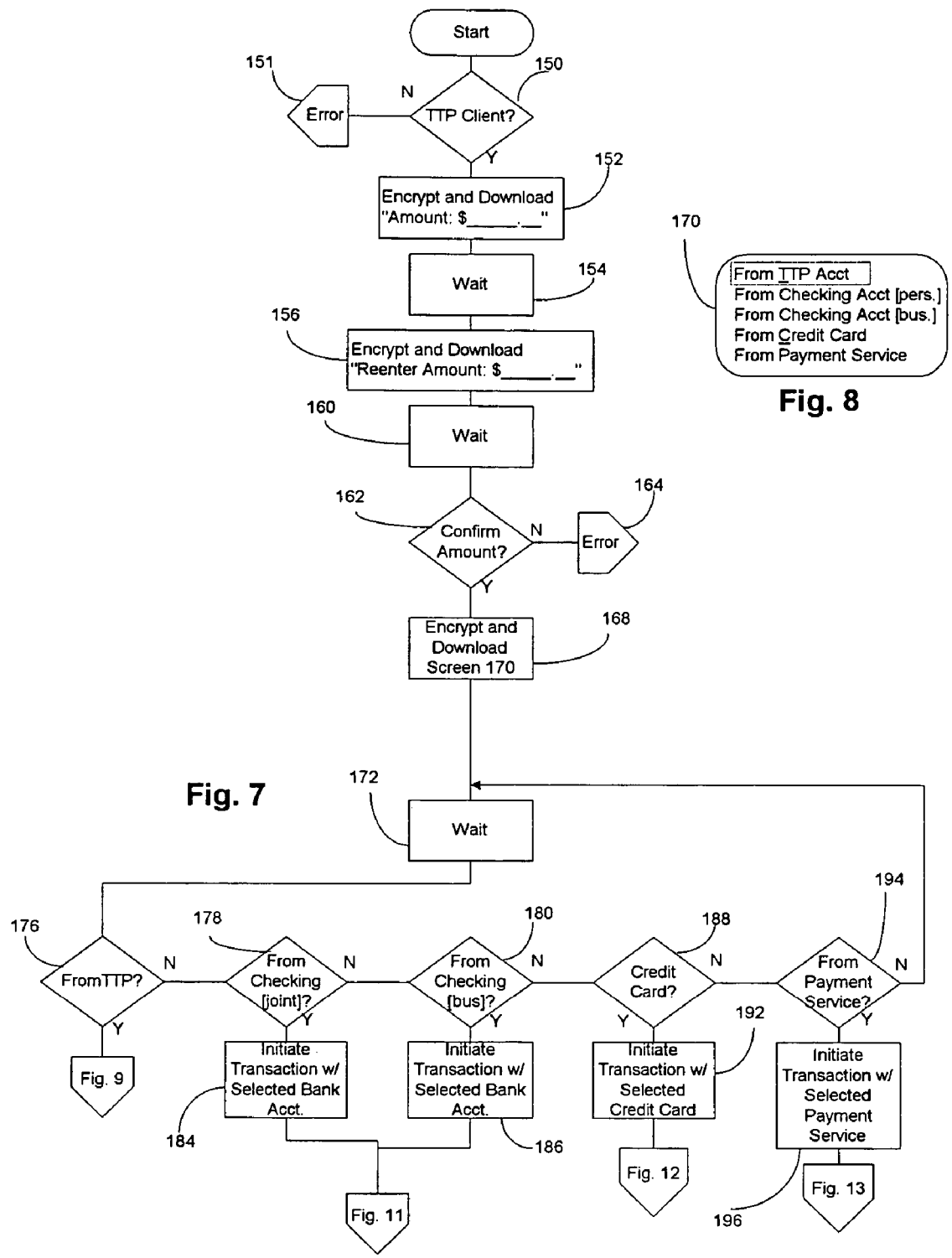

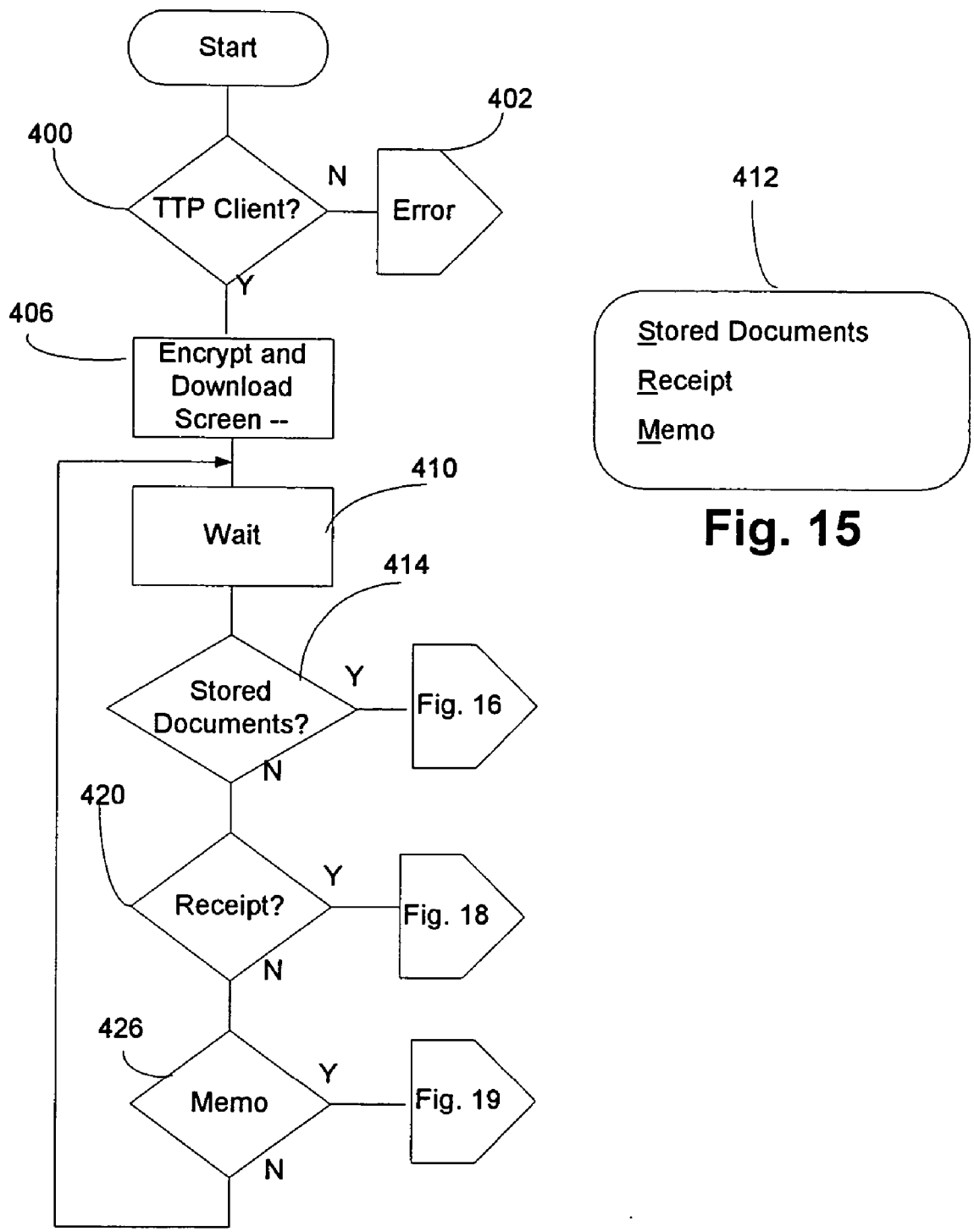

METHOD AND SYSTEM FOR FACILITATING TRANSACTIONS

BACKGROUND OF THE INVENTION

The subject invention relates to a method and system for facilitating transactions such as purchases. More particularly it relates to a method and system for facilitating transactions between a first party (sometimes hereinafter a "buyer") and second party (sometimes hereinafter a "seller") where the parties do not have a basis for trust.

A problem in completing a transaction between parties who may have little or no knowledge of each other, or worse too much knowledge, is the need to establish trust. One prior solution was for one party to provide the other with a tangible token, typically a paper document, which would serve as proof that the first, providing party had or would fulfill his or her obligations in the transaction; where the authenticity of the document was readily apparent, such as by recognizable visible characteristics. For example a buyer may give a seller a twenty-dollar bill in payment. The seller trusts that payment in the amount of twenty dollars has been received because the bill is "signed", i.e. authenticated, by an elaborate combination of engraving, watermarks, special paper, etc. Or the buyer may offer a check in payment and the seller may request identification. A seller will trust a driver's license or passport because the picture affixed matches the bearer and because it has been "signed" in various ways by the issuing agency. Similarly a buyer may require a signed receipt as proof of purchase so a refund or repair or replacement can be obtained if the purchased goods or services are defective or unsatisfactory.

(As used herein the term "obligation" is meant broadly to include anything which a party must do or prove to complete a transaction. It includes not only payment and providing of receipts but also proof of identity, entitlement, status or authority where necessary. The term "transaction" is also meant broadly to include any significant commercial, financial, or similar interaction between parties).

Use of such tokens or documents has proven satisfactory as a means of carrying out transactions for many years, indeed for many centuries. However use of such tokens does present problems. To carry out the affairs of everyday life a party must carry many documents or tokens: some cash, licenses, identification papers, documents or tokens which evidence status or authority (e.g. a police badge or identification card), tickets, passes, coupons, etc. The possible list of such tokens or documents is essentially endless. Typically a party will carry such documents in a wallet or purse and if that wallet or purse is forgotten, or does not contain what is expected, serious embarrassment or inconvenience can result. Or if the wallet or purse is lost or stolen the owner may suffer serious losses. Any cash is likely lost. And a thief or dishonest finder can possibly access the owner's accounts, make fraudulent purchases using the owner's credit cards, incur substantial debts using the owner's identity and commit other fraudulent acts limited only by his or her creativity and ingenuity.

Recently a new approach to the problem of providing a basis for trust between parties has been developed and is exemplified by payment services such as the service provided under the tradename "PayPal", which uses digital signatures in lieu of visible ones. Instead of "signed" paper documents digitally signed electronic documents are provided to, i.e. transmitted to a computer available to, those from whom trust is sought. The recipient's computer can then use public key cryptography to verify the signature on the electronic document since the recipient knows, because he or she is using a known computer which is programmed to communicate with the payment service, that the electronic documents have been transmitted through the payment service and the recipient trusts the service to have authenticated the digital signature.

This approach has proven useful in areas such as internet sales but presents problems with respect to more typical transactions where the other party will typically not have access to a computer. One way to resolve this difficulty would be for the first party to use a portable computer (e.g. a Personal Digital Assistant or PDA) to initiate a transaction and then loan it to the second party, from whom trust is sought, to verify the digitally signed documents. The problem with this is that a dishonest first party could program his or her computer to fraudulently present false information.

Thus it is an object of the subject invention to provide a method and system for facilitating transactions by establishing trust between parties in a way which does not require the first party, seeking trust, to carry tangible tokens as evidence that the first party will fulfill his or her obligations. It is another object of the subject invention that the second party, from whom trust is sought, need not have access to a communications device to the second party.

BRIEF SUMMARY OF THE INVENTION

The above object is achieved and the disadvantages of the prior art are overcome in accordance with the subject invention by a method, and a system for carrying out that method, for facilitating a transaction between a first party and a second party, said method including the steps of: a) a remotely located, trusted third party system receiving the first party's instructions for fulfilling at least a part of said first party's obligations in said transaction; then b) the third party communicating with the second party in a manner which provides said second party with perceptible assurance that said second party is in communication with said trusted third party system; and then c) transmitting information to said second party to provide assurance that said first party's instructions have been or will be fulfilled. Thus trust in the third party is transferred to the first party and said second party can trust that said first party's obligations have been or will be fulfilled.

In accordance with one aspect of the subject invention the first party transmits said instructions to said trusted third party system through a portable communications device which is one of a plurality of essentially functionally identical communications devices, whereby said first party can use any of said plurality of devices to transmit said instructions.

In accordance with another aspect of the subject invention the devices all have perceptible features which are difficult to reproduce, and are all tamper resistant. Thus the second party can be assured that said portable communications device is an authorized device and that said information provided by said trusted third party system is authentic.

(By "perceptible features" herein is meant physical features of a device, or signals produced by a device, which be directly perceived by a user, either from the device itself or when the device is used, without use of encryption technology or the like. By "difficult to reproduce" herein is meant that the cost of reproduction is sufficiently high to substantially prevent attempts to produce unauthorized copies. In accordance with the present invention "perceptible assurance" is provided by "perceptible features" associated with a third party known to be trustworthy.)

In accordance with another aspect of the subject invention the trusted third party system transmits said information to said second party through said portable communications device.

In accordance with another aspect of the subject invention the information transmitted by said trusted third party system includes secret information shared by said trusted third party system and said second party and is based upon a pattern of information exchanged by said trusted third party system and said second party during the development of a relationship.

In accordance with another aspect of the subject invention the information transmitted by said trusted third party system is modified and structured by an artificial personality program.

In accordance with another aspect of the subject invention the first party's obligations in said transaction include payment to said second party from a first party account.

In accordance with another aspect of the subject invention the method includes the further step of said second party providing instructions to said third party directing how said payment is to be made.

In accordance with another aspect of the subject invention the first party's obligations in said transaction include providing a copy of a document to said second party.

In accordance with another aspect of the subject invention the said trusted third party system digitally signs said document on behalf of said first party.

In accordance with another aspect of the subject invention the method includes the further step of said second party providing instructions to said third party directing how said document is to be delivered.

In accordance with another aspect of the subject invention the method includes the further step of said third party system saving a record of the transaction for later use in case of a dispute.

Other objects and advantages of the subject invention will be apparent to those skilled in the art from consideration of the detailed description set forth below and the attached drawings.

BRIEF DESCRIPTION OF THE DRAWINGS

FIG. 5 shows a flow diagram of the operation of the server of FIG. 3 in selecting a function to be performed.

FIG. 6 shows a screen downloaded from the server of FIG. 3 for display by the communications device of FIG. 1.

FIG. 7 shows a flow diagram of the operation of the server of FIG. 3 in performing a payment function.

FIG. 8 shows a screen downloaded from the server of FIG. 3 for display by the communications device of FIG. 1.

FIG. 14 shows a flow diagram of the operation of the server of FIG. 3 in performing a document function.

FIG. 15 shows a screen downloaded from the server of FIG. 3 for display by the communications device of FIG. 1.

DETAILED DESCRIPTION OF PREFERRED EMBODIMENTS OF THE INVENTION

Figure 1:
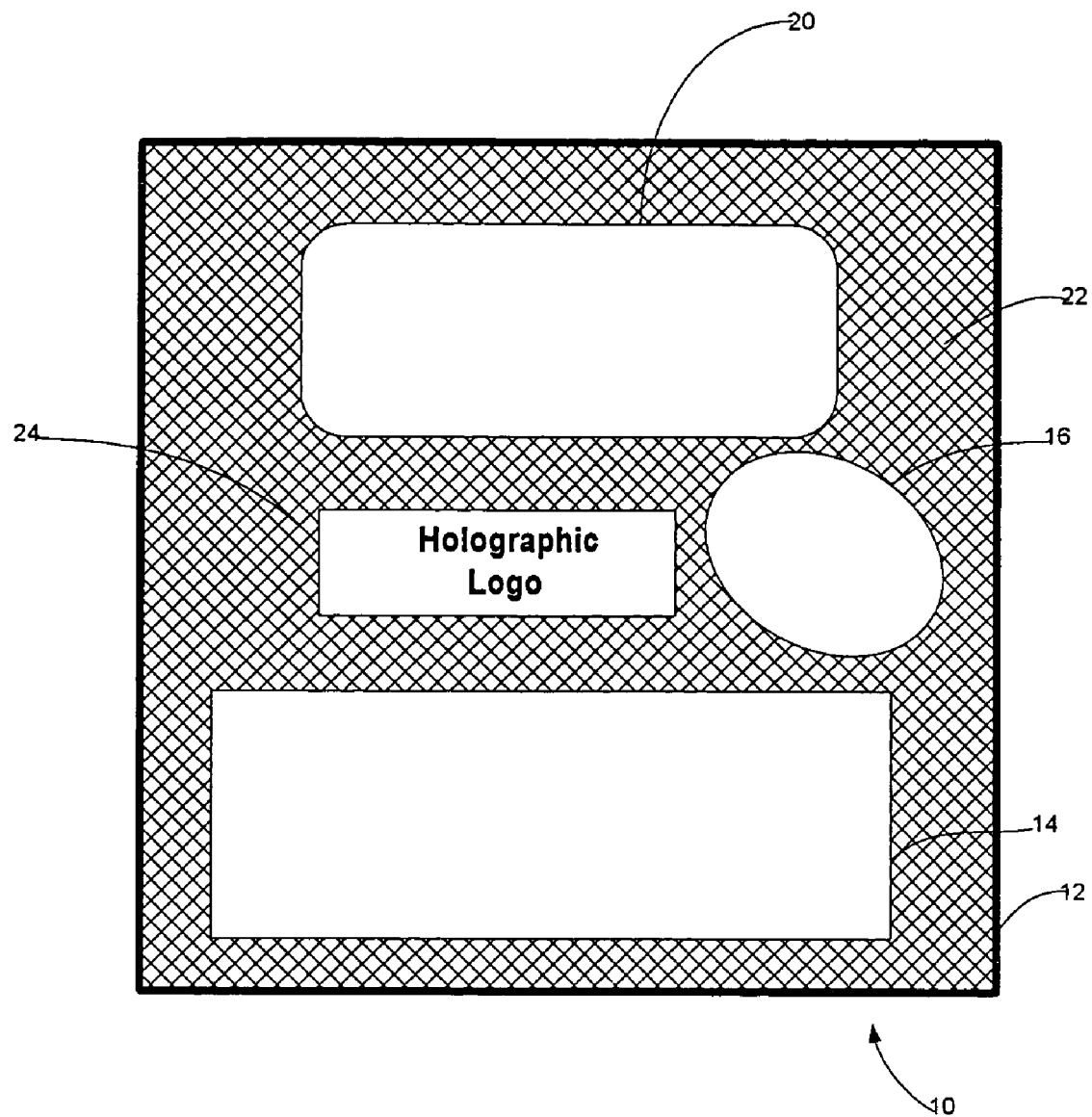
FIG. 1 shows a semi-schematic plan view of a portable communications device in accordance with the subject invention.

FIG. 1 shows portable communications device 10 which is provided by a trusted third party to a first party who is a client of the trusted third party system. (By "trusted third party system" herein is meant a party trusted by both the first party (client) and the second party to a transaction. As will be apparent from the context, the term "trusted third party" will sometimes refer to a secure server system which is controlled by such person or organization to carry out the functions of a trusted third party.)

Communications device 10 is enclosed by sealed, tamper resistant housing 12 to provide assurance that it has not been modified and will operate as intended. Device 10 includes keyboard 14 for user input, thumbprint reader 16 for biometric identification of a user, and display 20 for output to a user. To provide assurance to users that device 10 is an authorized device provided by the trusted third party, housing 12 includes perceptible, difficult to reproduce, features 22, as well as holographic logo 24. Features 22 can include special materials used to make housing 12, patterns or textures etched or otherwise affixed to its surface, fibers or particles embedded in its surface, or a unique form or shape of housing 12, or combinations thereof. In other embodiments of the subject invention other input mechanisms such as touch sensitive screens or microphones; other biometric inputs such as voice recognition, handwriting recognition, or keystroke patterns; and other output mechanisms such as speakers, can be used. Such input and output mechanisms and biometric inputs are known and need not be described further here for an understanding of the subject invention.

Figure 2:
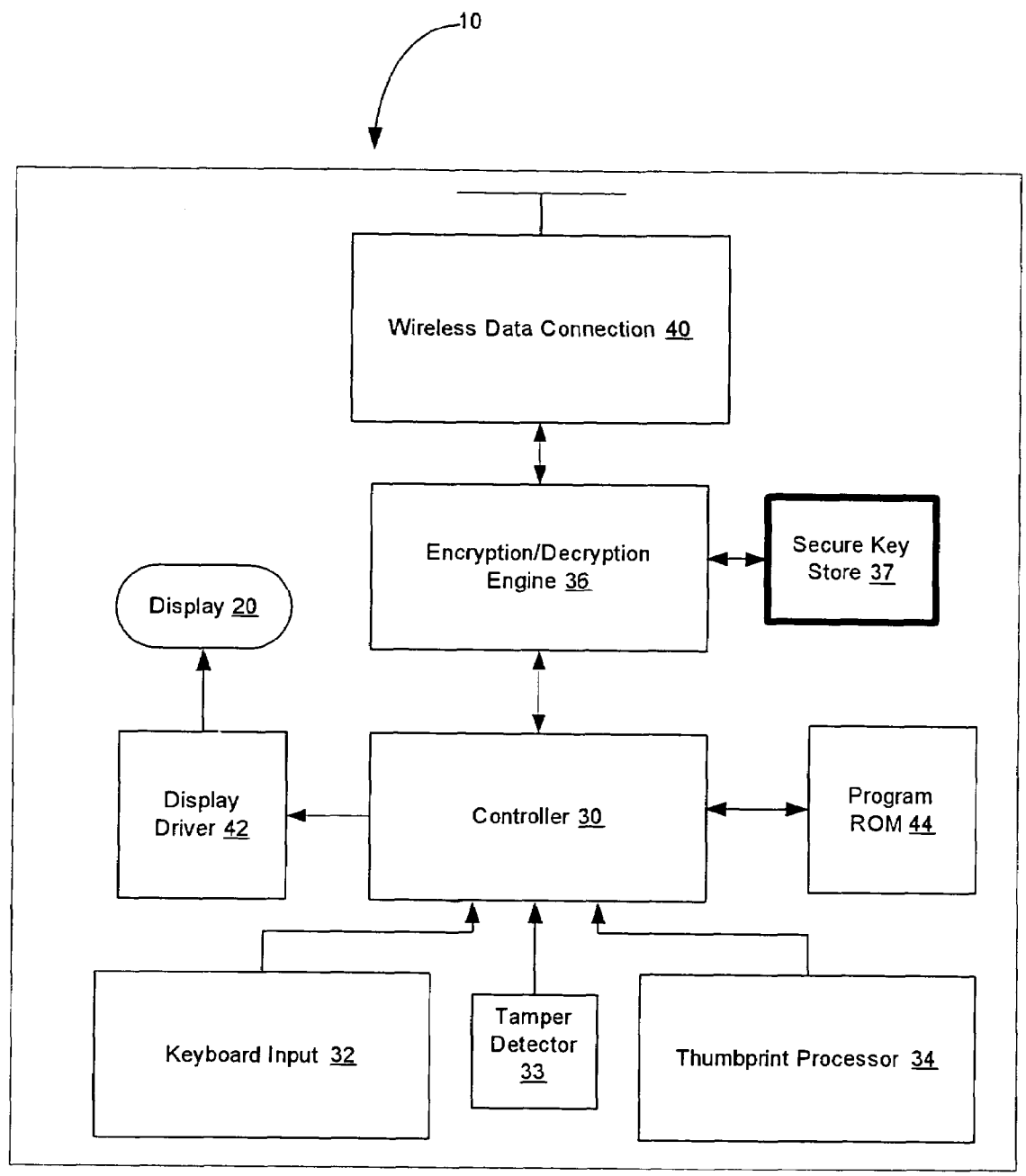
FIG. 2 shows a schematic block diagram of the communications device of FIG. 1.

FIG. 2 shows a block diagram of portable communications device 10. Controller 30 receives input from keyboard input circuitry 32 and thumbprint processor 34, which controls thumbprint reader 16 and provides an output representative of a user's thumbprint in a conventional format. Controller 30 uploads user input, and thumbprint data, to the trusted third party system through encryption/decryption engine 36 and wireless data connection 40. Device 10 encrypts and signs data transmitted to the trusted third party system in a conventional manner for communications security, and preferably will have its own code to secure communications. Controller 30 downloads and decrypts encrypted screen data from the trusted third party system through connection 40 and engine 36 and outputs the decrypted data to display 20 through display driver 42. Preferably wireless data connection 40 communicates through the cellular telephone network in a conventional manner since this network is believed to provide the broadest geographical range of coverage, but any convenient form of wireless communications can be used in other embodiments of the subject invention. Preferably program code to control devise 10 is stored in read-only memory (ROM) 44 to provide further assurance against unauthorized modification.

Communications device 10 includes tamper-detection system 33 that records attempts to tamper with the device. Attempts to tamper with the device include attempting to open the device, applying high or low temperature to the device, applying electromagnetic radiation to the device beyond an intensity limit, or applying high or low voltage to the device. The device will change at least a part of its data, and controller 30 will upload the changed data so that the third party system will be aware of the attempted tampering. Such tamper-detecting systems are known to those skilled in the art and need not be described further here for an understanding of the invention. Device 10 also includes conventional, secure cryptographic key storage 37, which is in communication with encryption/decryption engine 36. Cryptographic keys in key storage 37 are managed using known key management protocols such as those defined by ANSI X9.42 "Agreement of Symmetric Keys Using Discrete Logarithm Cryptography" ANSI X9.44 "Key establishment using factoring-based public key cryptography for the financial services industry" or any other key management protocol.

Figure 3:
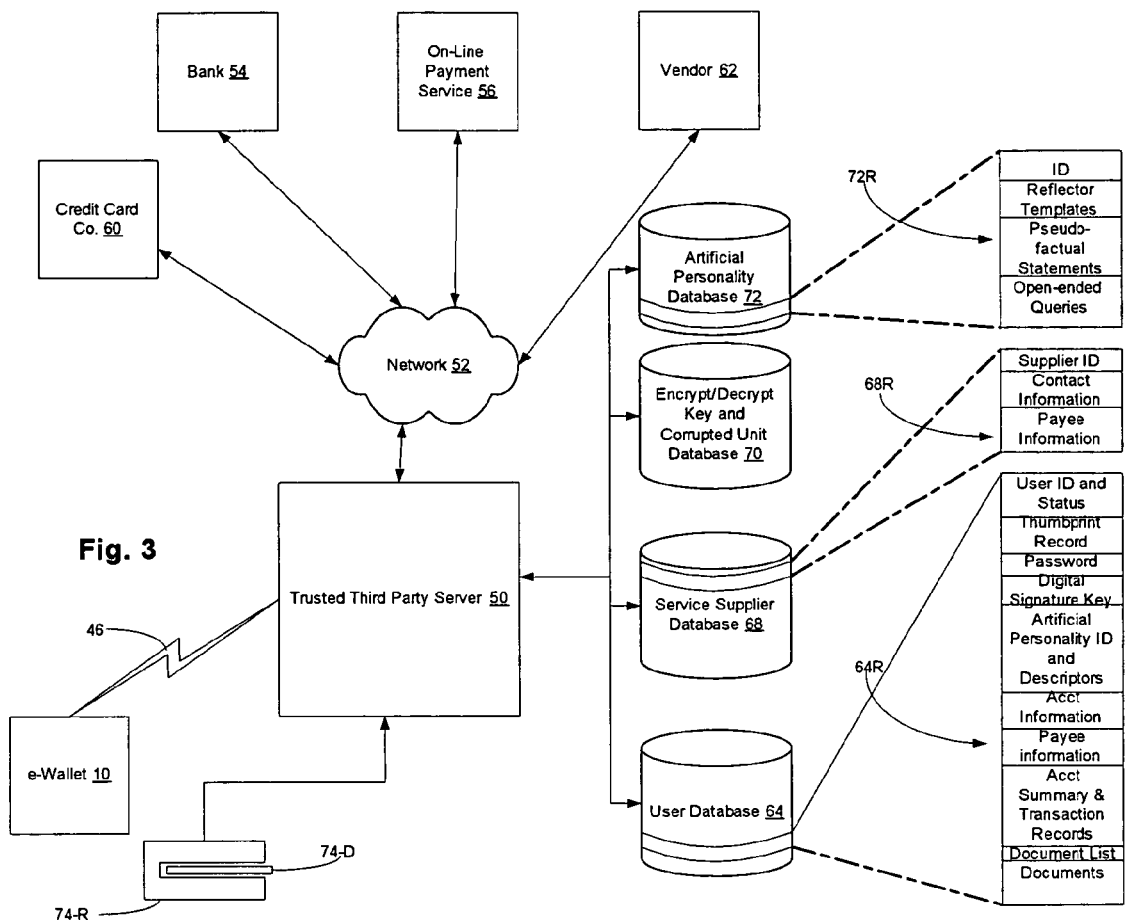
FIG. 3 shows a system including a server for communicating with the communications device of FIG. 1 in accordance with the present invention.

FIG. 3 shows a system where device 10, which can be any of a plurality of essentially functionally identical devices, communicates through communications link 46, which, as discussed above, can be any convenient link, with server 50. Server 50 also communicates through network 52 with various service providers. Network 52 can be the Internet, the public switched telephone network or any other convenient communications network. Bank 54, payment service 56, and credit card company 60 all provide a user who is a client of the trusted third party with ways to make payments to second parties. Clients can also place orders with vendor 62. (It should be noted that server 50 typically will communicate with more than one, and preferably several, service suppliers of each type, and that the present description shows only a single supplier of most types for reasons of simplicity of description only.)

(By "client" herein is meant a buyer or other first party user who uses the trusted third party to establish trust with a seller or other second party in a transaction. It is anticipated that the trusted third party will provide clients with communications devices 10 and the clients will compensate the trusted third party through transaction or rental fees. Details of the trusted third party's business model form no part of the subject invention however, and will not be discussed further here).

Server 50 also communicates with user database 64, which contains records for all users of the system, service supplier database 68, which contains records of all service suppliers, encryption/decryption database 70, which contains unique encryption/decryption keys for each of portable communication devices 10 in service, as well as a "blacklist" of corrupted devices 10 which have been reported as lost or stolen or which have shown signs of tampering and with which server 50 will not communicate and; artificial personality database 72, which stores records 72R defining a plurality of artificial personalities.

Preferably, communications between device 10 and third party system 50 employ a device specific encryption/decryption key. In other embodiments, device 10 and system 50 may employ a public key protocol such as server and client authenticated secure sockets layer (SSL) for authentication, data integrity and confidentiality.

User record 64R includes the fields: user id and status, i.e. whether or not the user is a client; a thumbprint record for the user; a client password; a client digital signature key; an artificial personality id and descriptors which identifies a particular artificial personality maintained by server 50 to communicate with a second party user and various descriptors which have been developed in the course of a relationship between the artificial personality and the second party user; client account information, which identifies various client accounts from which payments can be made; payee information which directs how various forms of payment to a user should be directed; an account summary, which includes records of previous transactions and the balance of an account with the trusted third party system for the user as well as, preferably, a list of at least current debits and credits to the account; a client document list of documents stored for a client; and documents stored for the client. Each of these fields and its function will be described further below.

It should be note that not all fields need have data for all users. Since, in the preferred embodiment presently described, only clients can act as first parties and access payment and document functions, records for users who are not clients need not have passwords, digital signature keys, stored documents, nor client account information; while records for clients who do not act as second parties need not have payee information nor an artificial personality id and descriptors; as will be more fully explained below.

Vendor record 68R includes: contact information such as a URL which allows server 50 to contact the identified vendor to place an order, and payee information which directs how payment is to be made to the vendor.

Artificial personality record 72R includes: reflector templates which are used to create responses reflecting descriptors which have been extracted from a user's input; pseudo-factual statements which describe characteristics of the artificial personality or other putative "facts" (e.g. "The weather is nice here."); and open-ended queries which are used to continue the dialog when no other response can be generated. For each personality these templates, statements and queries are substantially the same semantically but vary in vocabulary and style to help differentiate the various personalities. By selecting a particular record 72R a corresponding particular artificial personality can be selected and executed using a common artificial personality routine. These stylistic differences, combined with information about each user which is contained in the extracted descriptors, give the user a feeling that he or she is "talking to someone they know" when they communicate with server 50 through a selected artificial personality, as will described further below.

Initialization of the various databases described above (e.g. identification of a clients accounts and authorization for the trusted third party to access these accounts) can be carried out in any convenient manner; details of which form no part of the present invention and need not be described further here.

Program code to control server 50 in accordance with the subject invention is provided on magnetic or optical disk 74-D and input through disk reader 74-R, or through any other suitable computer readable medium. The term "computer-readable medium" as used herein refers to any medium that participates in providing program code to a processor for execution. Such a medium may take many forms, including but not limited to, non-volatile media, volatile media, and transmission media. Non-volatile media includes, for example, optical or magnetic disks, or random access read only memory. Volatile media includes random access dynamic memory. Transmission media includes coaxial cables, copper wire and fiber optics. Transmission media can also take the form of acoustic or light waves, such as those generated during radio wave and infrared data communications. By "program code" herein is meant sequences of indicia recorded on, or signals transmitted by, computer readable media, which, when input by a processor cause a processor to carry out a corresponding sequence of operations, i.e. execute the program code.

Figure 4:
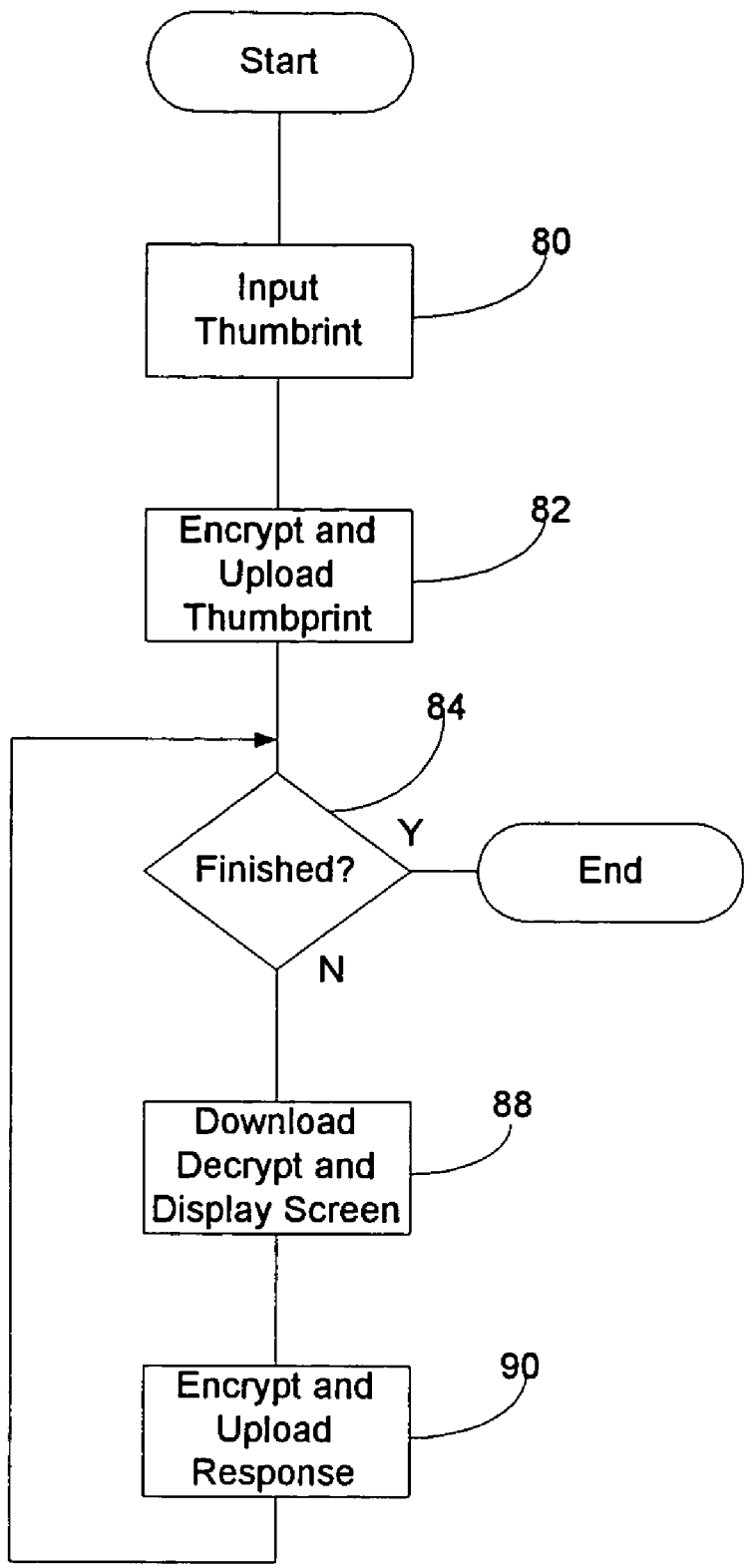
FIG. 4 shows a flow diagram of the operation of the communications device of FIG. 1.

Turning to FIG. 4 a flow diagram of the operation of communications device 10 is shown. At step 80 a session begins when a user's thumbprint is detected by thumbprint reader 16 and output as thumbprint identification data. At step 82 the thumbprint is encrypted using an encryption key, which is unique to device 10 and uploaded to server 50 where it is identified. Thumbprint readers are known, commercially available devices and need not be further described here for an understanding of the subject invention. In other embodiments of the subject invention other means for biometric identification of users, such as voice recognition or keystroke analysis can be used. Then at step 84 device 10 determines if server 50 has ended the session and, if so, exits. Otherwise, at step 88 it downloads and decrypts and displays a screen, and at step 90 encrypts and uploads a user response to server 50, and returns to step 84. Because each of device 10 uses a unique encryption key or uses a unique signing key, server 50 can identify device 10 to determine that it is an authorized device which has not been corrupted.

It will be apparent that the operation of device 10 is not unique in any manner, except for the unique encryption/decryption key which is used to identify device 10 to server 50 and provide secure communications in a conventional manner. Preferably, device 10 does not store any user or transaction specific information. Preferably, stored information includes only the device ID, cryptographic keys, possibly a transaction count, and state information such as tamper-detection status. Thus a lost or stolen device can easily be replaced without loss of any information or value and a device can be loaned to someone else without risk.

Turning to FIGS. 5 and 6 a flow diagram of the operation of, and a screen displayed by, server 50 in selecting a function to be performed are shown. At step 96 server 50 inputs and tests a thumbprint scan from device 10 to recognize a user. (Those skilled in the art will recognize that server 50 decrypts each input received to assure that it is from an authorized and uncorrupted device 10.) Such recognition of users by thumbprints, or other biometrics, is well known and need not be discussed further here for an understanding of the subject invention. At step 100 server 50 determines if the user has an account with the trusted third party and, if not, at step 102 encrypts and downloads to device 10 a message indicating that only parties who have accounts with the trusted third party can initiate a transaction, and exits. (Limiting the ability to initiate transactions to those who have accounts is preferred as simplifying operation of server 50 though other embodiments where a transaction can be initiated by any party are within the contemplation of the subject invention.)

Since it is possible to deceive a thumbprint reader by "lifting" a thumbprint, at step 104 server 50 preferably will encrypt and down load a message requesting a password, and at step 108 will wait for input of the password from device 10. (The "wait" at step 108, and at other steps, should be understood to include a timeout function to an appropriate error routine, as well as conventional input and decryption functions for the anticipated input. Details of such timeout error routines, as well as other error routines shown at other steps, and input and decryption functions, do form any part of the subject invention and need not be described further here.) At step 110 server 50 determines if the password is correct and, if not, goes to an error routine at step 112. Otherwise, at step 116 server 50 encrypts and downloads screen 114 (shown in FIG. 6).

Screen 114 allows a user to select among, and initiate transmission of instructions for carrying out, the functions: Pay, Send Document, Review Account, Order, or Exit, in any convenient manner, such as by highlighting and clicking or by entry of an indicated abbreviation. At step 120 server 50 waits for input from device 10 and at step 124 determines if the Pay function has been selected. If so, at step 126 server 50 calls the Pay routine (shown in FIG. 7). Otherwise, server 50 goes to step 128. At step 128 server 50 determines if the Send Document function has been selected. If so, at step 132 server 50 calls the Send Document routine (shown in FIGS. 14 and 15). Otherwise, server 50 goes to step 134. At step 134 server 50 determines if the Review Account function has been selected. If so, at step 136 server 50 calls the Review Account routine (shown in FIG. 20). Otherwise, server 50 goes to step 138. At step 138 server 50 determines if the Order function has been selected. If so, at step 140 server 50 calls the Order routine (shown in FIG. 21). Otherwise, server 50 goes to step 142. At step 142 server 50 determines if the Exit function has been selected. If so, server 50 exits. Otherwise, i.e. an improper command has been entered, server 50 returns to step 120 to wait for a next command. On return from each of the above described routines server 50 goes step 116 and again downloads screen 116.

FIGS. 7 and 8 show the operation of server 50 in carrying out the Pay function. At step 150 server 50 determines if the user is a client and, if not, goes to an appropriate error routine at step 151. (Preferably only clients of the trusted third party will have access to the Pay function as well as certain other functions as described below.) Otherwise, at step 152 server 50 encrypts and downloads a request for the amount of payment to device 10 and waits at step 154. Then at steps 156 and 160 server 50 requests reentry of the amount and at step 162 confirms the amount or goes to an appropriate error routine at step 164.

At step 168 server 50 encrypts and downloads screen 170 (shown in FIG. 8) to device 10. Screen 170 allows the client to select a payment account from among: a trusted third party account, personal or business checking accounts, a credit card or a payment service (e.g. PayPal). Preferably a client will select or update the number and types of accounts (which of course can vary from client to client), enable access by the trusted third party system to the selected accounts, in any secure, convenient manner; details of which form no part of the present invention, at the time the client relationship is established or when the client wishes to add or delete accounts.

At step 172 server 50 waits for input from device 10 and at step 176 determines if a trusted third party account has been selected. If so, payment is made from an account the client maintains with the trusted third party, as will be described below with respect FIG. 9. Otherwise, server 50 goes to step 178 or step 180. At step 178 or 180 server 50 determines if a business or personal checking account has been selected. If so, at step 184 or 186 server 50 initiates a transaction through network 52 with the selected account and makes payment as will be described below with respect to FIG. 11. Otherwise, server 50 goes to step 188. At step 188 server 50 determines if the credit card account has been selected. If so, at step 192 server 50 initiates a transaction through network 52 with the selected account and makes payment as will be described below with respect to FIG. 12. Otherwise, server 50 goes to step 194. At step 194 server 50 determines if a payment service has been selected. If so, at step 196 server 50 initiates a transaction through network 52 with the payment service and makes payment as will be described below with respect to FIG. 13. Otherwise, i.e. an improper command has been entered, server 50 returns to step 172 to wait for a next command.

Figure 9:
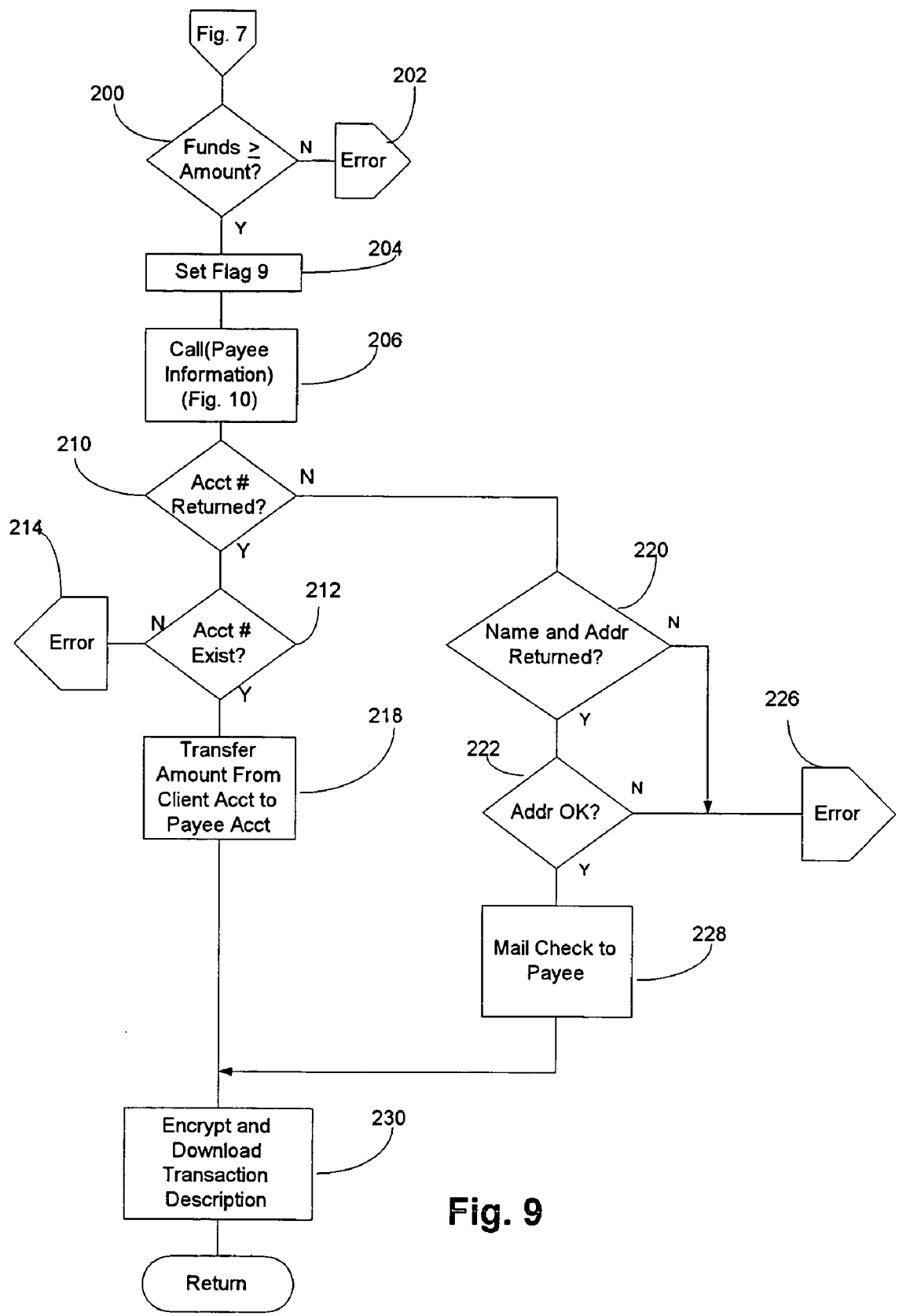
FIG. 9 shows a flow diagram of the operation of the server of FIG. 3 in making payment from an account with a trusted third party system.

Turning to FIG. 9, if a trusted third party account has been selected, at step 200 server 50 determines if the account contains sufficient funds and, if not goes to an appropriate error routine at step 202. Otherwise, at steps 204 and 206, server 50 sets a flag, or otherwise indicates the information sought, and calls the Payee Information routine (shown in FIG. 10) to obtain the information needed to make the indicated payment. In the preferred embodiment shown, when payment is to be made from a trusted third party account this is either a second party account with the trusted third party or an address to which a check will be sent. In other embodiments the trusted third party system can have a capability to wire money to a second party's bank account or make payment in any other convenient manner.

Then at steps 210 and 212 server 50 determines if an account number has been returned and, if so, if such account exists. If the account does not exist then server 50 goes to an appropriate error routine at step 214. Otherwise, at step 218 the indicated amount is transferred from the first party's account to the second party's (payee's) account. Then, at step 230 server 50 encrypts and downloads a description of the transaction and returns to step 116 shown in FIG. 5 to determine if a user wishes to select another function.

At step 210, if an account number is not entered the, at steps 220 and 222 server 50 determines if an address has been entered for the second party and if such address is valid. (Numerous address hygiene databases for determining if an address is valid, i.e. internally consistent, exist and their use need not be described further here for an understanding of the subject invention.) If no address, or an invalid address, is provided, then at step 226 server 50 goes to an appropriate error routine at step 226. Otherwise, at step 228 server 50 causes a check drawn against the first party's (Payer's) account to be sent to the second party, and goes to step 230.

Figure 10:
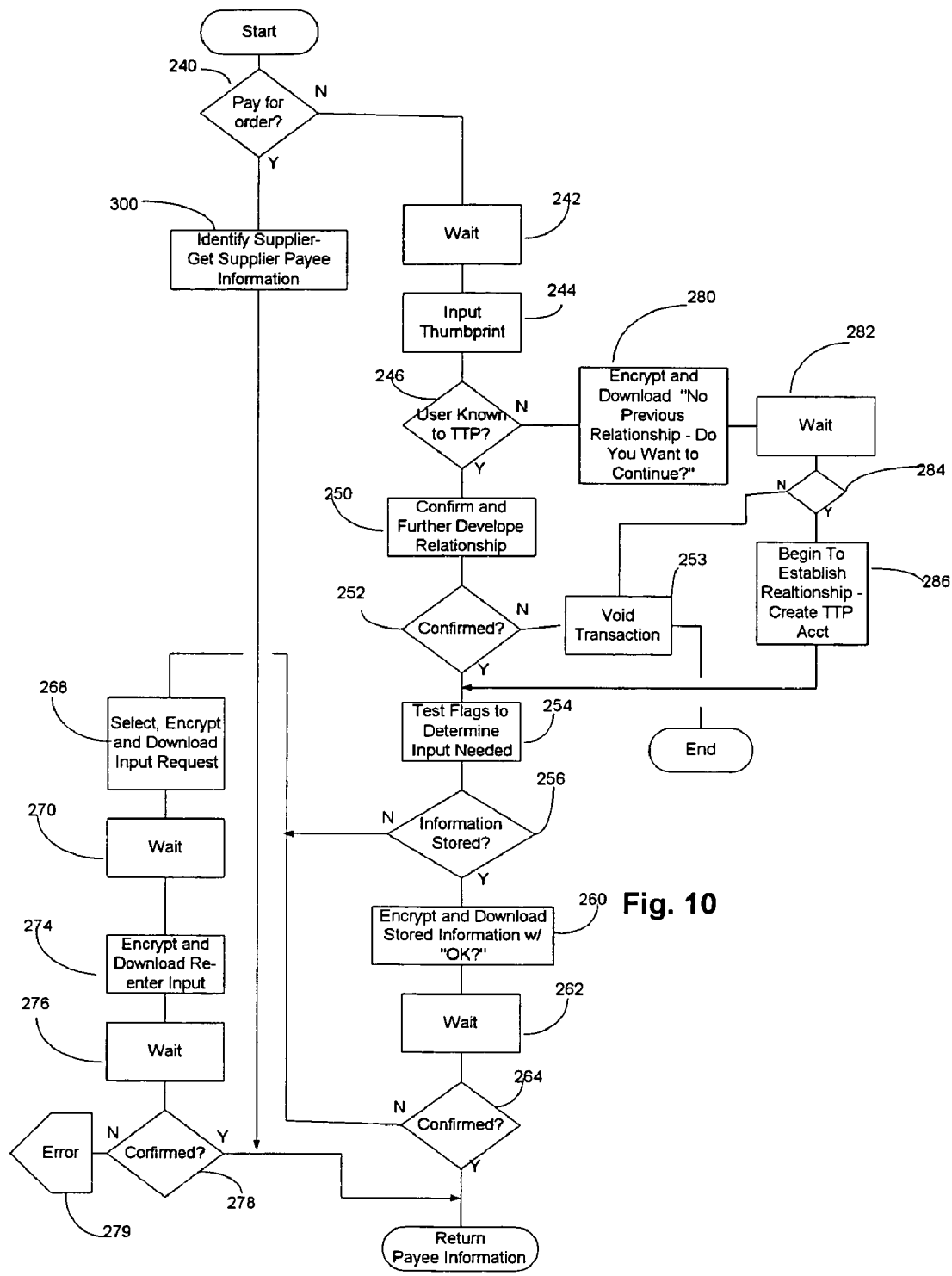
FIG. 10 shows a flow diagram of the operation of the server of FIG. 3 in obtaining payee information.

In FIG. 10 sever 50 determines payee information needed to direct payment or carry out other selected function such as the delivery of documents. At step 240 server 50 determines if the Payee Information routine has been called to make payment for an order placed with a supplier, as will be described further below with respect to FIG. 21. Otherwise, at steps 242 and 244 server 50 inputs a thumbprint from a second party user, e.g. a seller. Then, at step 246 it determines if a relationship exists between the second party and the trusted third party.

If so, at step 250 the relationship is confirmed and further developed. In the preferred embodiment shown the step of confirming and developing a relationship between the second party user and the trusted third party system provides the second party with perceptible assurance, beyond that provided by difficult to reproduce features 22 (shown in FIG. 1), that he or she is dealing with an artificial personality which is "someone they know" even if device 10 is provided by the first party, as will be described further below with respect to FIG. 22. In other embodiments of the subject invention the third party can simply provide a shared secret such as a password or the second party can rely solely on features 22 for assurance. Then at step 252 server 50 determines if the second party user has confirmed the relationship and, if not, at step 253 voids the current transaction and exits.

If the second party user confirms the relationship, then at step 254 server 50 tests flags to determine what payee information is needed; bank account number, mailing address, etc. and at step 256 determines if the necessary payee information has been previously stored. If so, at steps 260, 262 and 264 the information is downloaded for confirmation and, if confirmed, returned to the calling routine. Otherwise, if at step 256 it is found that the necessary information is not stored, or at step 264 the information is not confirmed, server 50 goes to step 268. At steps 268, 270, 272, 274, 276, and 278 server 50 selects a request for the second party information appropriate to the function being carried out (i.e. information needed to transfer funds, deliver documents, etc.) to be input, and receives and confirms the information provided, and, if confirmed, returns the information to the calling routine. If the information is not confirmed server 50 goes to an appropriate error routine at step 279.

Returning to step 246, if no previous relationship exists then at steps 280, 282, and 284 the second party user is given the chance to discontinue the transaction. If the user chooses to continue, at 286 server 50 begins to establish a relationship between the user and a selected artificial personality, as will be described further with respect to FIG. 22, and opens an account for the user. This will allow second party users who are not clients to establish trust with the third party while building a relationship, by initially limiting transactions to low risk situations where the first party is known and/or the amount at risk is small. Opening an account with the trusted third party for users who are not clients provides a convenient way for such users to accumulate small transaction amounts. If the user chooses not to continue server 50 goes to step 253 and exits, as described above. Otherwise, server 50 goes to step 254 to obtain payee information as described above.

Figure 11:
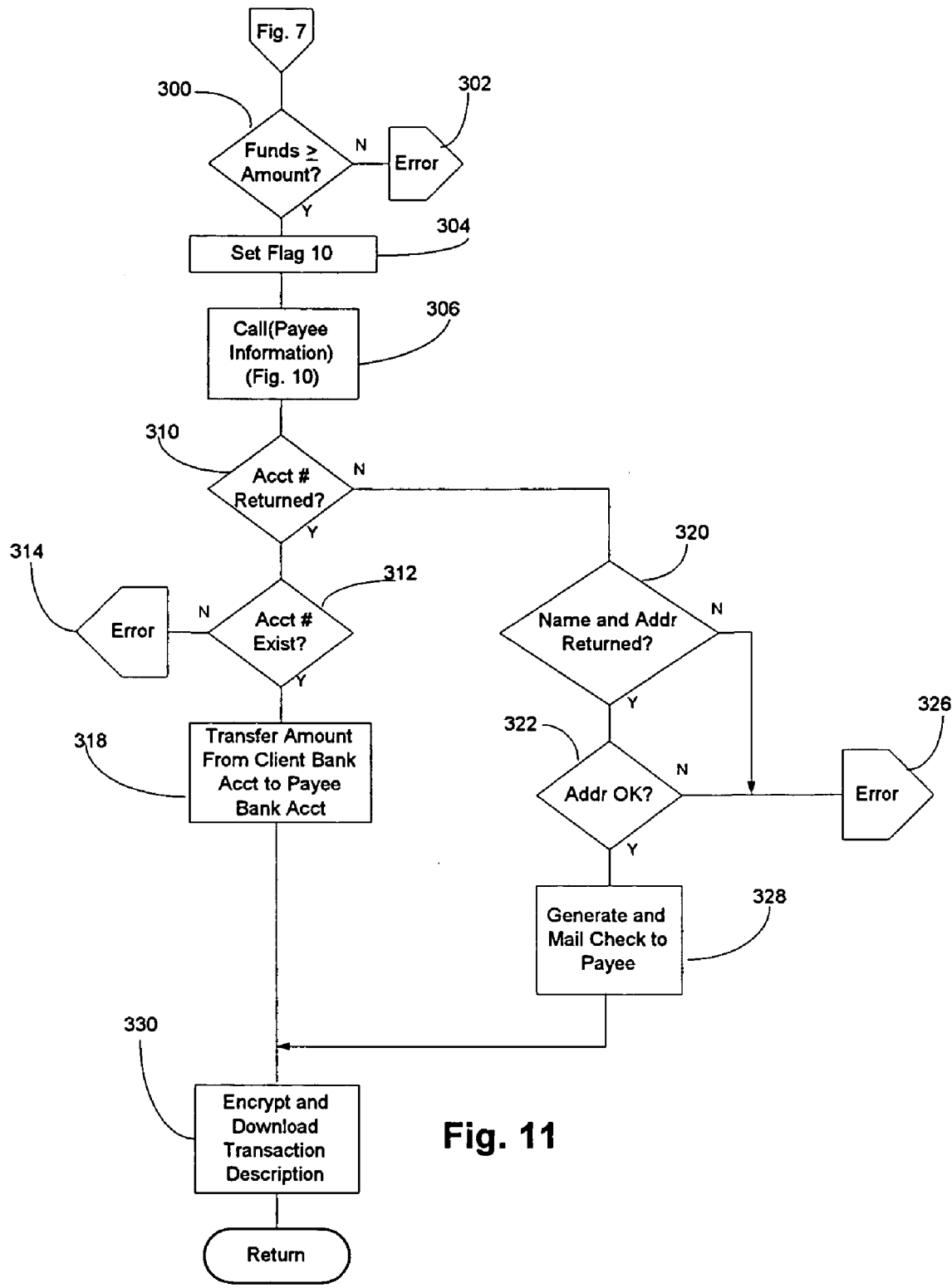
FIG. 11 shows a flow diagram of the operation of the server of FIG. 3 in making payment from an account with a bank.

Turning to FIG. 11, if a checking account has been selected, at step 300 server 50 determines if the account contains sufficient funds and, if not goes to an appropriate error routine at step 302. Otherwise, at steps 304 and 306, server 50 sets a flag, or otherwise indicates the information sought, and calls the Payee Information routine (shown in FIG. 10) to obtain the information needed to make the indicated payment. In the preferred embodiment shown this is either a checking account number or an address to which a check will be sent. In other embodiments the trusted third party system can have a capability to transfer money to a trusted third party account, or make payment in any other convenient manner.

Then at steps 310 and 312 server 50 determines if an account number has been returned and, if so, if such account exists. (It should be understood that the account number information preferably will include a routing number identifying the bank at which the second party's account is maintained.) If the account does not exist then server 50 goes to an appropriate error routine at step 314. Otherwise, at step 318 the indicated amount is transferred from the first party's account to the second party's (payee's) account.

At step 310, if an account number is not entered the, at steps 320 and 322 server 50 determines if an address has been entered for the second party and if such address is valid. If no address, or an invalid address, is provided, then at step 326 server 50 goes to an appropriate error routine. Otherwise, at step 328 server 50 causes a check drawn against the first party's (payer's) account to be sent to the second party. Then, at step 330 server 50 encrypts and downloads a description of the transaction and returns to step 116 shown in FIG. 5 to determine if a user wishes to select another function.

Figure 12:
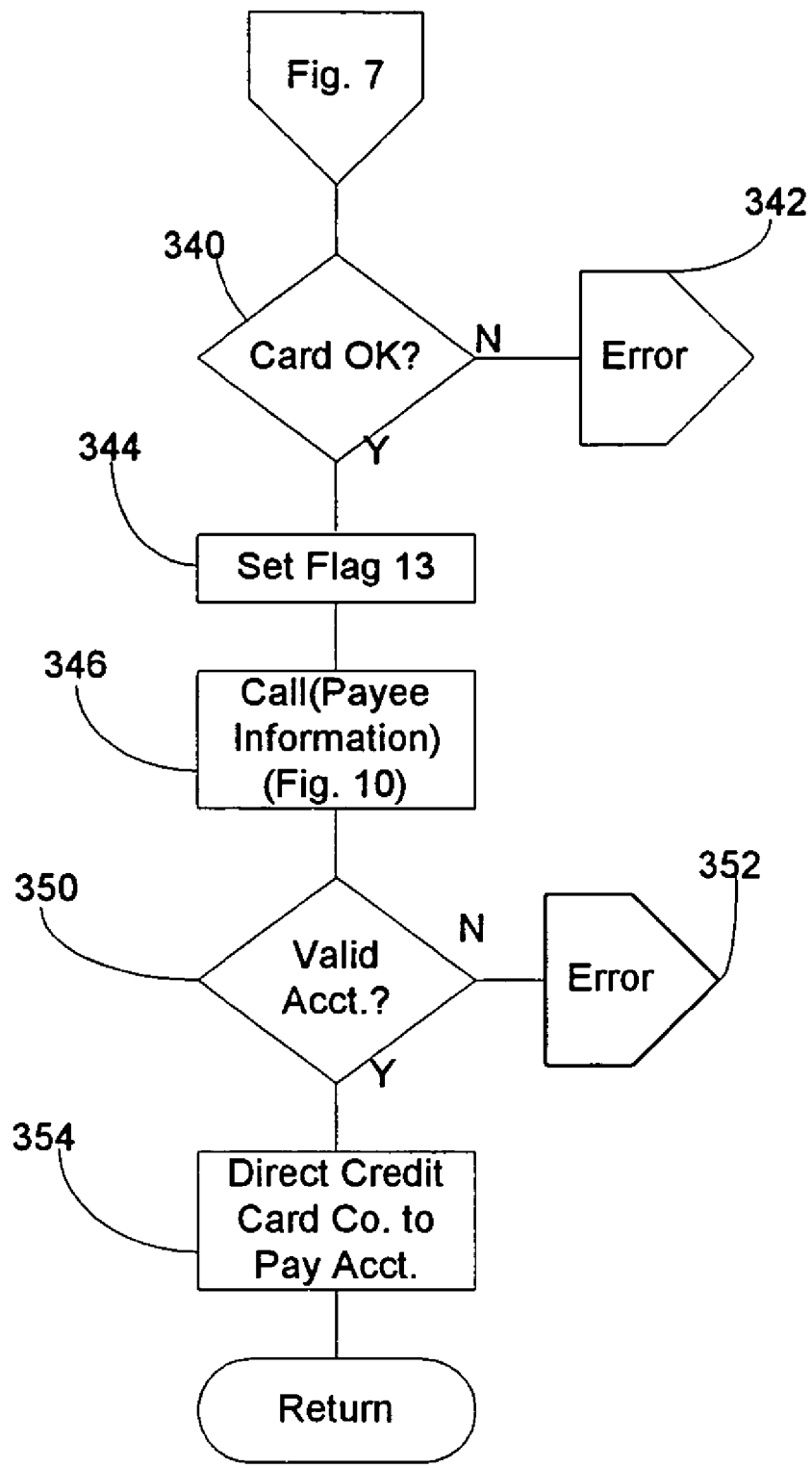
FIG. 12 shows a flow diagram of the operation of the server of FIG. 3 in making payment by credit card.

Turning to FIG. 12, if a credit card account has been selected, at step 340 server 50 determines if the card is valid and under its credit limit and, if not goes to an appropriate error routine at step 342. Otherwise, at steps 344 and 346, server 50 sets a flag, or otherwise indicates the information sought, and calls the Payee Information routine (shown in FIG. 10) to obtain the information needed to make the indicated payment; here the second parties account identification with the credit card company. At step 350 server 50 determines if the second party's account is valid and, if not goes to an appropriate error routine at step 352. Otherwise at step 354 server 50 directs the credit card company to make payment to the second party's account as though the transaction had taken place using a credit card in a conventional manner and returns to step 116 shown in FIG. 5.

Figure 13:
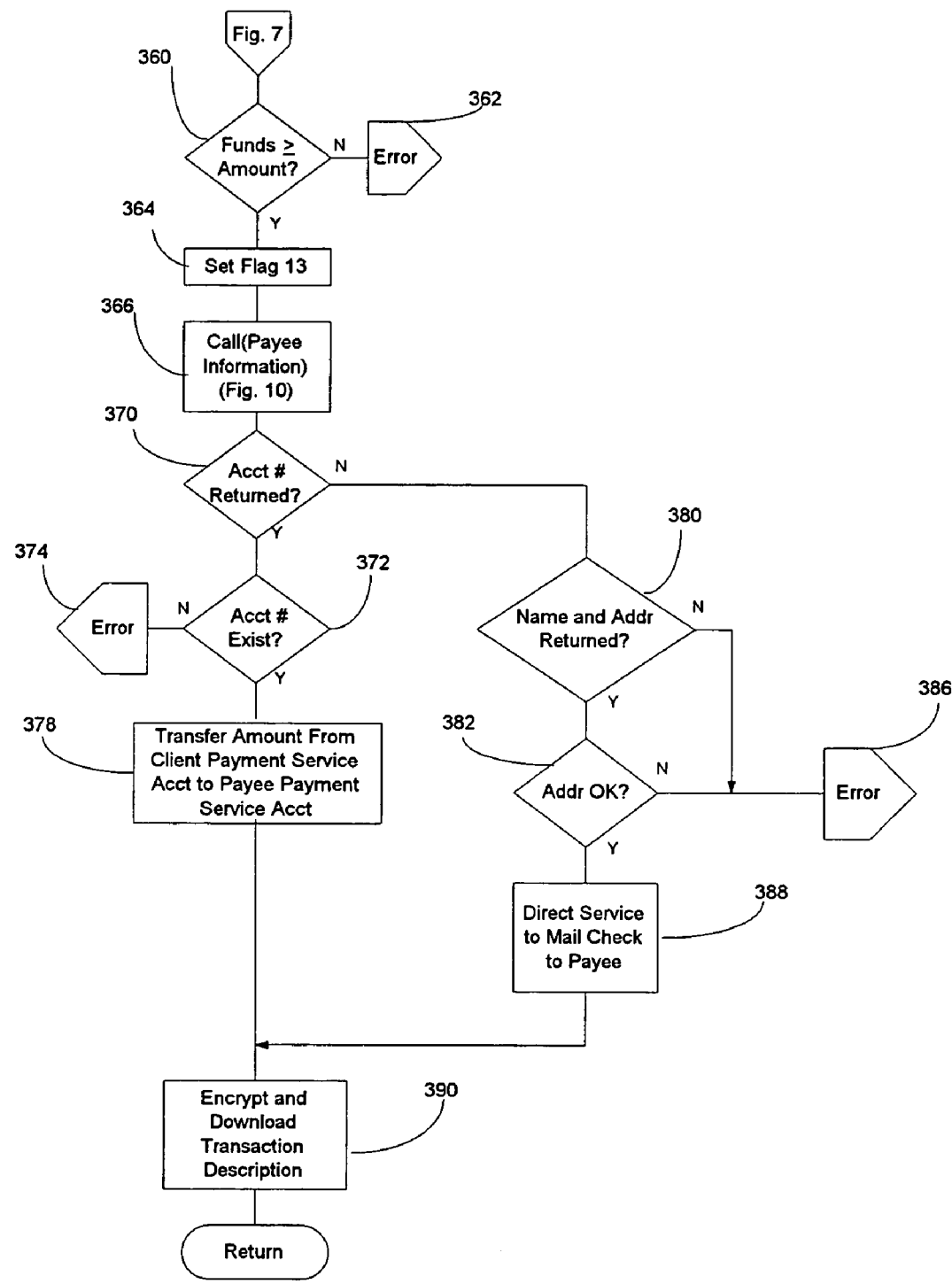
FIG. 13 shows a flow diagram of the operation of the server of FIG. 3 in making payment from an account with a payment service.

Turning to FIG. 13, if a payment service has been selected, at step 360 server 50 determines if the first party's payment service account contains sufficient funds and, if not goes to an appropriate error routine at step 362. Otherwise, at steps 364 and 366, server 50 sets a flag, or otherwise indicates the information sought, and calls the Payee Information routine (shown in FIG. 10) to obtain the information needed to make the indicated payment. In the preferred embodiment shown this is either a second party payment service account number or an address to which a check will be sent.

Then at steps 370 and 372 server 50 determines if an account number has been returned and, if so, if such account exists. If the account does not exist then server 50 goes to an appropriate error routine at step 374. Otherwise, at step 378 the indicated amount is transferred from the first party's account to the second party's (payee's) account. Then, at step 330 server 50 encrypts and downloads a description of the transaction and returns to step 116 shown in FIG. 5 to determine if a user wishes to select another function.

At step 370, if an account number is not entered the, at steps 380 and 382 server 50 determines if an address has been entered for the second party and if such address is valid. If no address, or an invalid address, is provided, then at step 326 server 50 goes to an appropriate error routine at step 386. Otherwise, at step 388 server 50 causes a check drawn against the first party's (payer's) account to be sent to the second party and goes to step 330.

FIGS. 14 and 15 show the operation of server 50 in carrying out the Send Document function. At step 400 server 50 determines if the user is a client and, if not, goes to an appropriate error routine at step 402. (Preferably only clients of the trusted third party system will have access to the Send Document function.)

At step 406 server 50 encrypts and downloads screen 410 (shown in FIG. 15) to device 10. Screen 410 allows the client to select a type of document to be sent to the second party from among: a previously stored document, a receipt, or a memo.

At step 412 server 50 waits for input from device 10 and at step 414 determines if a previously stored document has been selected has been selected. If so, sever 50 goes to the stored document routine shown in FIG. 16 and a stored document selected by the first party is digitally signed and sent to the second party, as will be described below with respect FIGS. 16 and 17. Typically stored documents can be documents such as licenses, identification, receipts or invoices, tickets, authorizations, etc. or any other document which a first party may want to present to a second party. Such documents can be entered into server 50 in any convenient manner; details of which form no part of the subject invention, except as may be claimed below.

Otherwise, server 50 goes to step 420 and determines if a receipt has been selected to be sent to the second party. If so, server 50 goes to the receipt routine shown in FIG. 18 to generate and send a receipt to the second party as will be described below with respect to FIGS. 17 and 18. Otherwise, server 50 goes to step 426 and determines if a memo has been selected. If so, server 50 goes to the memo routine shown in FIG. 19 to generate and send a memo to the second party as will be described below with respect to FIGS. 17 and 19. (As used herein the term "memo" includes any new document created by a first party and sent to a second party.) Otherwise, i.e. an improper command has been entered, server 50 returns to step 410 to wait for a next command.

Figure 16:
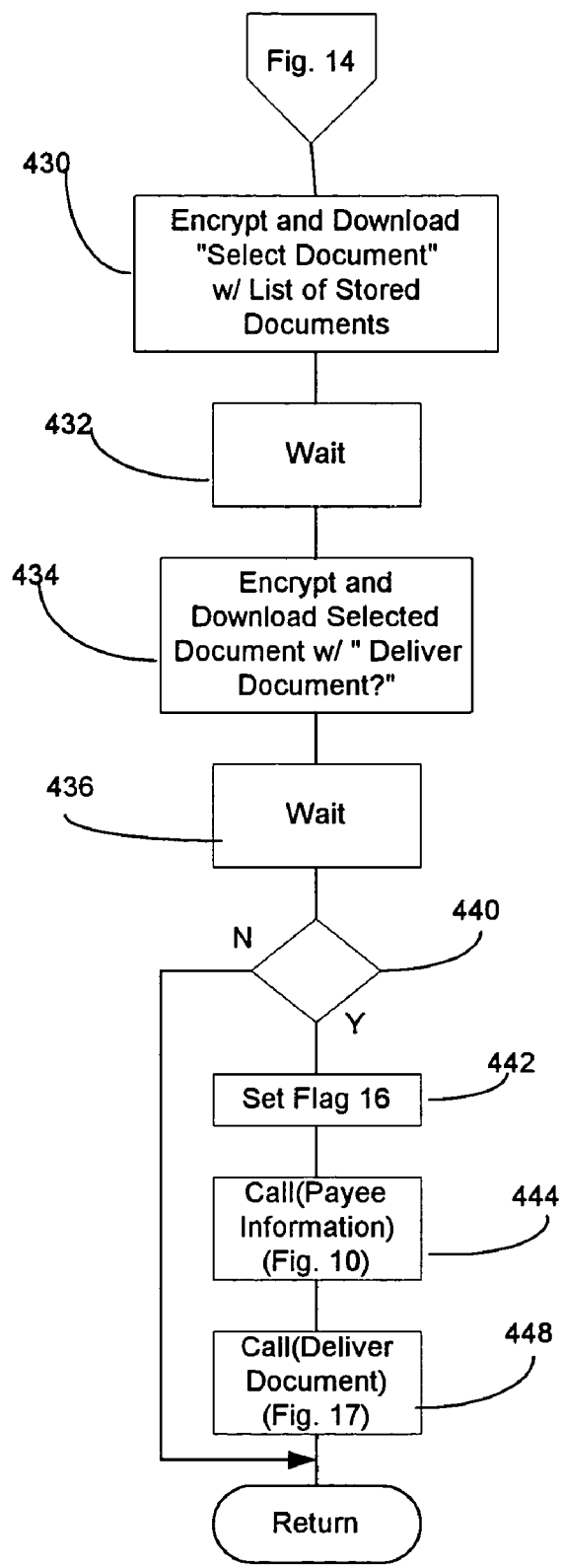
FIG. 16 shows a flow diagram of the operation of the server of FIG. 3 in selecting and displaying a stored document.

Turning to FIG. 16, at step 430 sever 50 encrypts and downloads a request for the first party to select a previously stored document from the list of stored documents in record 64R (shown in FIG. 3) and then waits at step 432. At step 434 server 50 encrypts and downloads the selected document and inquires if the document is to be delivered and waits at step 436. If it is determined at step 440 that the selected document is not to be delivered, server 50 returns to step 116 in FIG. 5 to determine if another function is requested.

Displaying documents without delivery allows a user to present stored documents such as licenses or id's to second parties who do not need to receive a copy. For example, during a routine traffic stop the police may request to see a license and vehicle registration but may not, without further grounds, have authority to require delivery of a copy.

If it is determined that the selected document is to be delivered, at step 442 server 50 sets an appropriate flag, or otherwise indicates the information needed. In the preferred embodiment described herein, documents can be delivered to a second party account with the trusted third party, an email address, or by facsimile. In other embodiments documents can be printed and mailed or delivered in any other convenient manner. Then at step 444, server 50 calls the payee information routine (shown in FIG. 10) to obtain the needed delivery information. (Note that by downloading appropriate information request prompts the payee information routine can be used to return document delivery information.) Then at step 448, server 50 calls the deliver document routine (shown in FIG. 17) to deliver the selected document and then, upon return from the deliver document routine, returns to step 116 in FIG. 5 to determine if another function will be requested.

Figure 17:
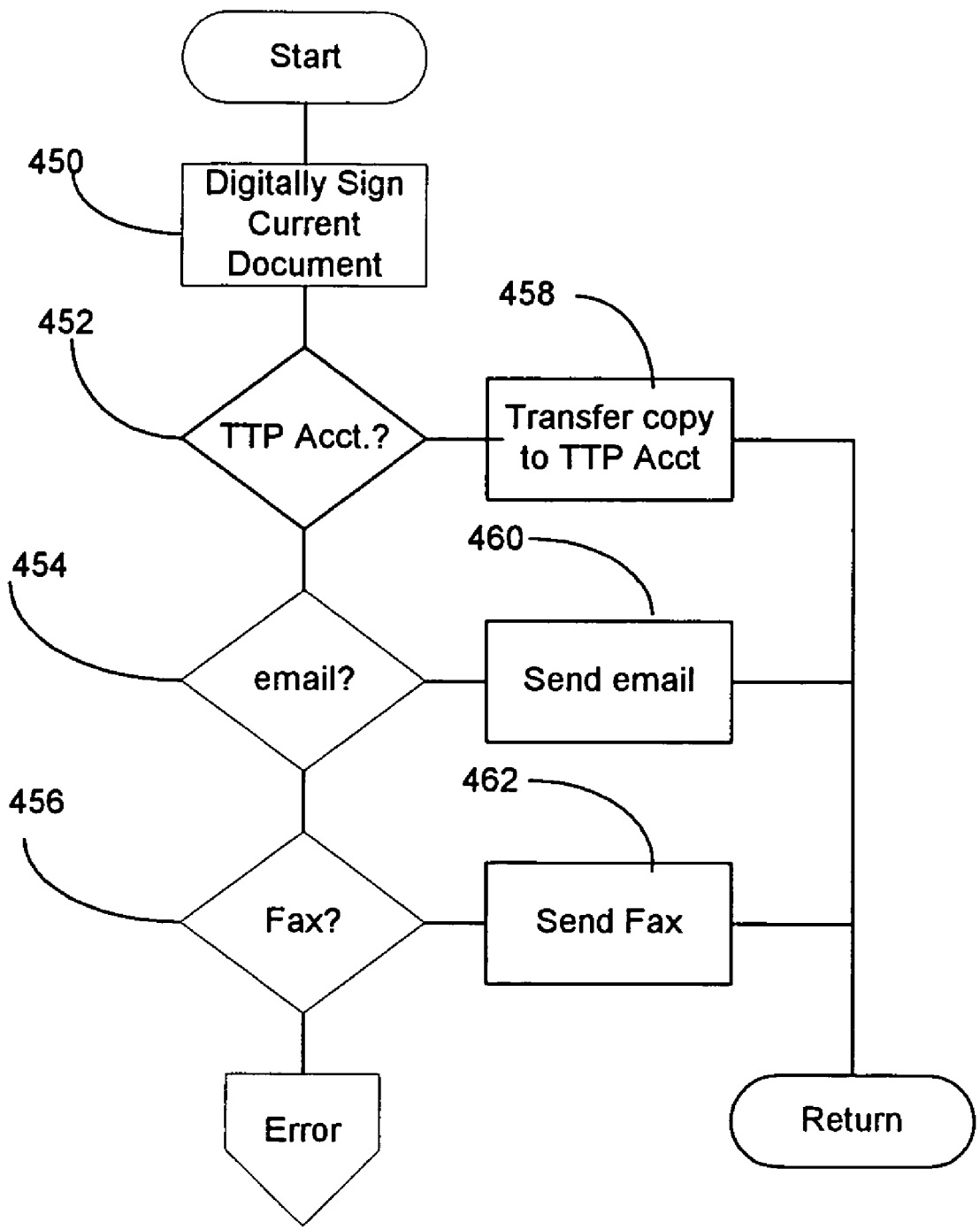
FIG. 17 shows a flow diagram of the operation of the server of FIG. 3 in delivering a displayed document.

Turning to FIG. 17, at step 450 a document to be delivered, which, in the embodiment shown, can be a selected stored document, a receipt, or a memo, is digitally signed using the first party's key stored in record 64R in FIG. 3. At step 452, 454, and 456 it is determined, based on the information returned at step 444 in FIG. 16, if the message is to be delivered to the second party's trusted third party account, email address, or facsimile number. If no appropriate delivery information is returned server 50 enters an appropriate error routine. Depending on the delivery mechanism selected sever 50 than executes step 458, 460 or 462 to copy the document to a second party account with the trusted third party, send it by email, or send it by facsimile transmission. These operations are well known in the art and need not be discussed further here for an understanding of the subject invention. Server 50 then returns to step 448 in FIG. 16, and then to step 116 in FIG. 5.

Figure 18:
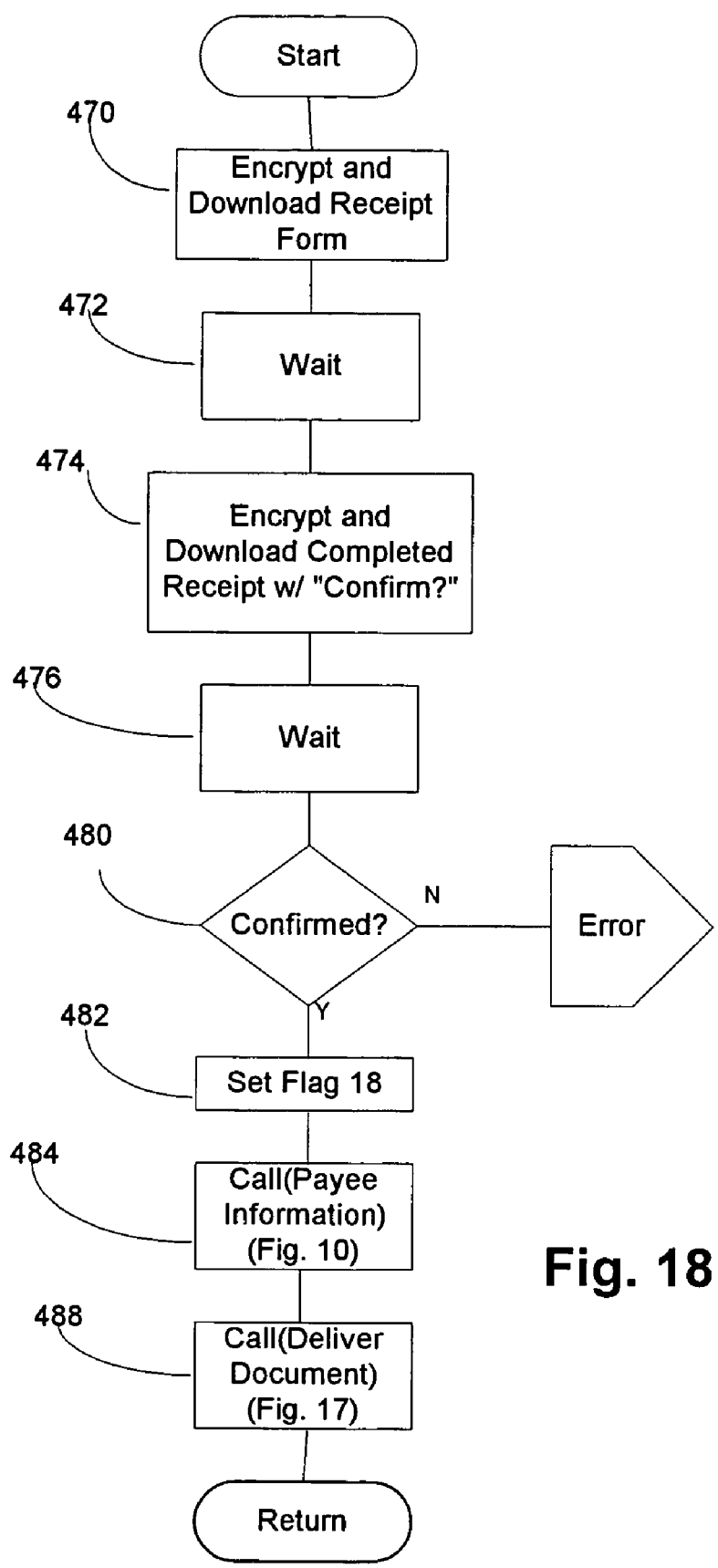
FIG. 18 shows a flow diagram of the operation of the server of FIG. 3 in providing a receipt.

FIG. 18 shows the operation of a preferred embodiment of the subject invention in creating and sending a receipt. At step 470 server 50 encrypts and downloads a receipt form for completion and then waits at step 472. At step 474 server 50 encrypts and downloads the completed receipt and inquires if the receipt is confirmed and waits at step 476. If it is determined at step 480 that the completed receipt form is not confirmed, server 50 enters an appropriate error routine, which typically will request reentry of the receipt information a predetermined number of times before exiting.

If it is determined that the receipt is to be delivered, at step 482 server 50 sets an appropriate flag, or otherwise indicates the information needed. Then at step 484, server 50 calls the payee information routine (shown in FIG. 10) to obtain the needed delivery information. Then at step 488, server 50 calls the deliver document routine (shown in FIG. 17) to deliver the selected document and then returns to step 116 in FIG. 5 to determine if another function will be requested.

Figure 19:
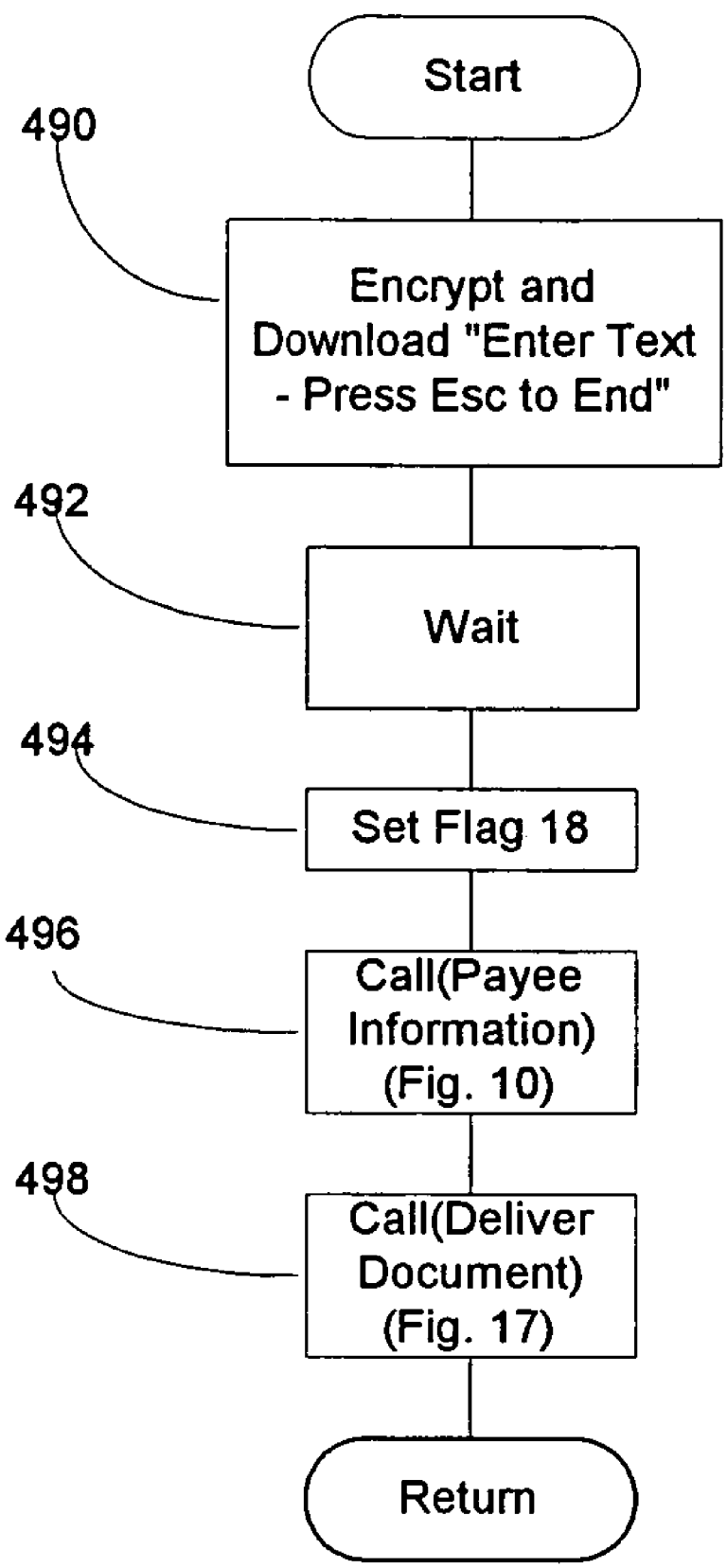
FIG. 19 shows a flow diagram of the operation of the server of FIG. 3 in creating a memo.

FIG. 19 shows the operation of a preferred embodiment of the subject invention in creating and sending a memo. At step 490 server 50 encrypts and downloads a prompt for text entry and then waits at step 492. At step 494 server 50 sets an appropriate flag, or otherwise indicates the information needed. Then at step 496, server 50 calls the payee information routine (shown in FIG. 10) to obtain the needed delivery information. Then at step 498, server 50 calls the deliver document routine (shown in FIG. 17) to deliver the selected document and then returns to step 116 in FIG. 5 to determine if another function will be requested. Note that since the memo is digitally signed using the first party's digital signature key memos may, depending on the applicable law relating to digital signatures, serve as binding offers or acceptances and create binding contractual obligations.

Figure 20:
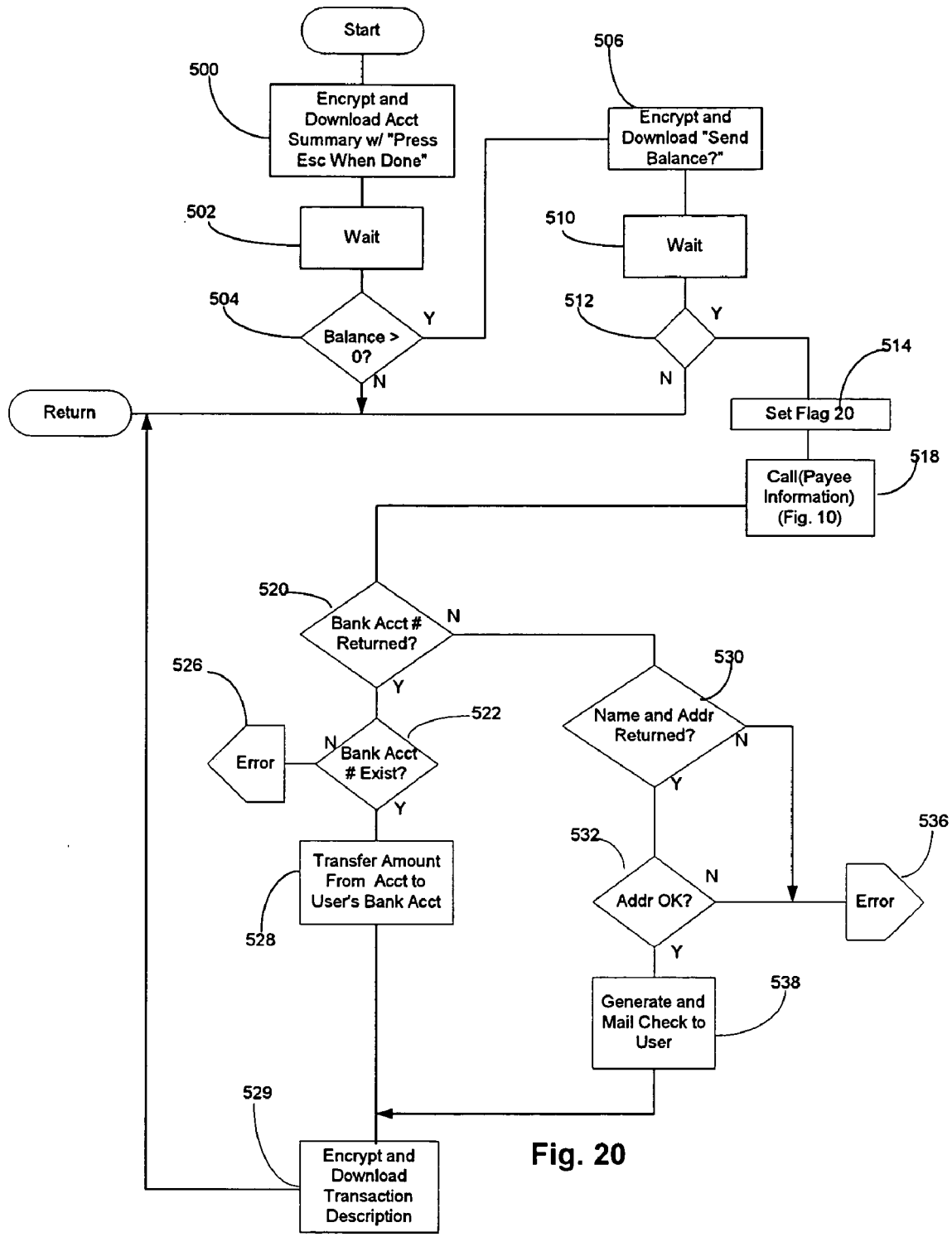
FIG. 20 shows a flow diagram of the operation of the server of FIG. 3 in performing a review account function.

FIG. 20 shows the operation of a preferred embodiment of the subject invention in performing an account review function which allows a user to review the status of his or her trusted third party account and to receive any positive balance in that account. In the embodiment shown this is the only function which is available to non-client users. As is shown at step 286 in FIG. 10, when a new second party first begins to establish a relationship with the trusted third party the trusted third party system will automatically open an account for the second party. This provides a convenient way for non-client sellers to accept and accumulate small payments without the need to handle multiple small checks or provide account information to the trusted third party system before trust is fully established. Providing a convenient way to handle multiple small transactions thus permits a non-client user to build trust slowly while limiting exposure. Client users also can review and receive balances from their accounts.

At steps 500 and 502 server 50 downloads account information to device 10 for review and waits for the user to indicate that review is completed. Then at step 504 server 50 determines if the account contains a positive balance and, if not, returns to step 116 in FIG. 5 to determine if another function is requested. At steps 506, 510 and 512 server 50 downloads a prompt and waits for a response determining if the user wishes to have the balance sent. If not, server 50 returns to step 116 in FIG. 5.

Otherwise, at steps 514 and 518, server 50 sets a flag, or otherwise indicates the information sought, and calls the Payee Information routine (shown in FIG. 10) to obtain the information needed to make the indicated payment. In the preferred embodiment shown this is either a checking account number or an address to which a check will be sent.

Then at steps 520 and 522 server 50 determines if an account number has been returned and, if so, if such account exists. (It should be understood that the account number information preferably will include a routing number identifying the bank at which the second party's account is maintained.) If the account does not exist then server 50 goes to an appropriate error routine at step 526. Otherwise, at step 528 the indicated amount is transferred from the user's trusted third party account to the user's bank account. Then, at step 529 server 50 encrypts and downloads a description of the transaction and returns to step 116 shown in FIG. 5 to determine if a user wishes to select another function.

At step 520, if an account number is not entered the, at steps 530 and 532 server 50 determines if an address has been entered for the second party and if such address is valid. If no address, or an invalid address, is provided, then at step 536 server 50 goes to an appropriate error routine. Otherwise, at step 538 server 50 causes a check drawn against the user's trusted third party account to be sent to the user. Then, at step 529 server 50 encrypts and downloads a description of the transaction and returns to step 116 shown in FIG. 5.

Figure 21:
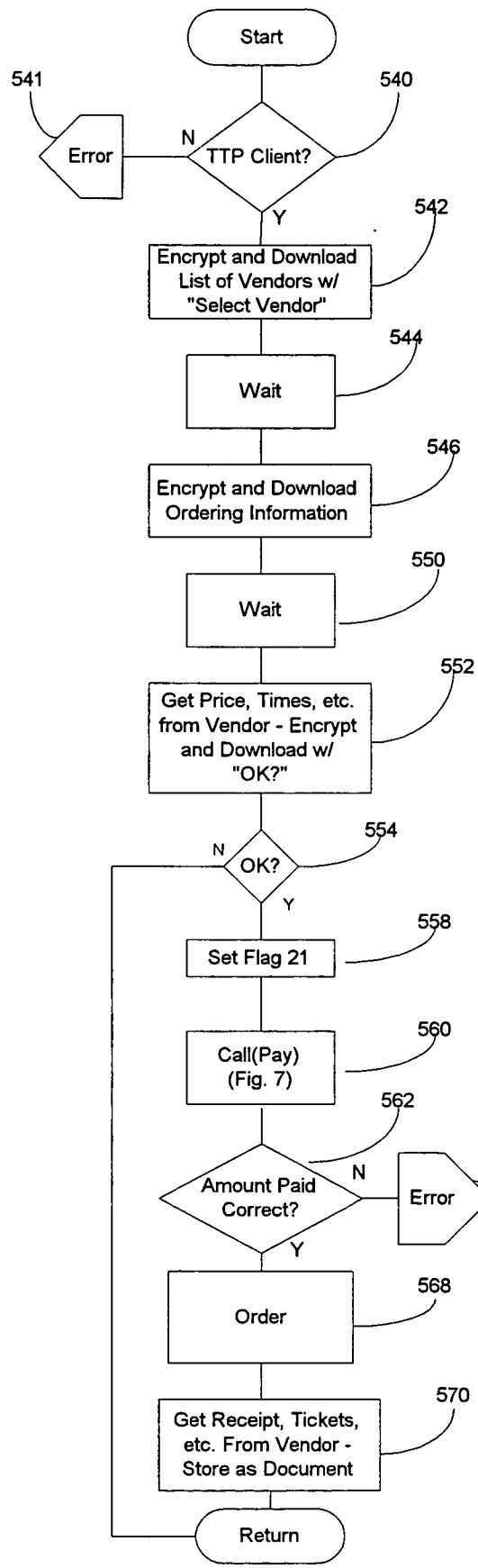
FIG. 21 shows a flow diagram of the operation of the server of FIG. 3 in performing an ordering function.

FIG. 21 shows the operation of a preferred embodiment of the subject invention in placing an order with a vendor with whom the trusted third party has established a relationship. Typically vendors will supply items such as tickets or services such as hotel accommodations but sale of anything which can conveniently be marketed over a network is within the contemplation of the present invention.

At step 540 server 50 determines if the user is a client and, if not goes to an appropriate error routine at step 541. If the user is a client server 50 down loads a list of vendors and a prompt to the user to select a vendor and waits for a user response at steps 542 and 544. Then at steps 546 and 550 server 50 downloads ordering information describing products available from the selected vendor and waits for the user to make a selection. (While vendor and product selection has been described as requiring only a single download in order to simplify the description those skilled in the art will recognize that typically selection of a purchase can involve a multi-level interaction between the user and server 50.) Then at step 552 server 50 obtains and downloads price, delivery times, etc, and at step 554 confirms the particulars of the purchase with the user. If the user rejects the purchase sever 50 returns to step 116 in FIG. 5 to determine if another function is requested.

Otherwise, at step 558 server 50 sets a flag to indicate, or otherwise indicates, that an order has been placed with a vendor and at step 560 calls the Pay routine (shown in FIG. 7) to pay for the order placed. Returning to FIG. 10, when the Payee Information routine is called by the Pay routine, at step 240 server 50 will determine that payment is to be made for an order placed with a vendor and at step 300 will access previously stored payment information for that vendor and return it to the Pay routine. Then at step 562 server 50 will determine if the amount is correct and, if not will enter an appropriate error routine at step 566. (Preferably server 50 also enters the error routine if the user selects a payment method which the vendor does not accept and has so indicated in the stored payment information.) If payment is correct, then at step 568 server 50 places the order with the selected vendor and at step 570 obtains and stores as documents any receipts, tickets, ect. needed to confirm the purchase; and returns to step 116 in FIG. 5 to determine if another function is requested.

It is a major feature of the subject invention that it allows a trusted third party to effectively vouch for a first party client to a second party in order that the second party can enter into a transaction with the first party, who is perhaps not known, with confidence that the first party's obligations will be carried out. (Third parties establish trust that can be used to vouch for their clients in a conventional manner; by building a reputation for reliably carrying out what they undertake to do and for providing known, accessible and effective mechanisms for correcting problems which may arise.) It is also a feature of the subject invention that the trusted third party system is not physically present and the transaction is carried out over a communications network such as the cellular telephone network. Further, the second party is typically not a client of the trusted third party and will often be using a communications device provided by the client/first party. Thus it is important that the second party have assurance that he or she is in fact communicating with the putative trusted third party system.

As described above is one way to do this, analogous to the way in which trust in a currency is established, is to provide clients (and possibly non-clients) with communications devices 10 which include perceptible physical features which are difficult to reproduce and are known to be associated with the trusted third party. While useful, this approach has limitations. It will always be possible to counterfeit any physical feature and new technologies may suddenly reduce the cost of such counterfeiting. Further it would be desirable if the functionality of the subject invention could be incorporated into widely available but unsecure devices such a cellular telephone or personal digital assistants (PDA's). A simple solution would be for server 50 an the non-client user to share a secret password which server 50 could provide as proof that the user was in fact communicating with the trusted third party system. Single passwords are notoriously insecure however. People make poor choices, write passwords down or allow others to learn their password. (How hard is it actually to learn someone's mother's maiden name?) More complex passwords are easily forgotten.

In accordance with the present invention these problems are overcome by providing an artificial personality which communicates with a second party user and establishes a unique relationship with that user. When the user communicates with the trusted third party system he or she will recognize the artificial personality and the user will have the feeling that they are talking to "someone they know".

Artificial personalities are a well known aspect of the more general field of artificial intelligence and the development of artificial personalities is well within the ability of those skilled in the artificial intelligence art. As of August 2003 examples of artificial personalities can be accessed on the Internet at http://www.ai.ijs.si/eliza/eliza.html, which emulates a psychotherapist, and http://www.personalityforge.com/, which allows users to converse with various artificial personalities and provides tools allowing users to develop artificial personalities themselves. While it is not believed that any artificial personalities yet developed have passed the Turing Test (i.e. can consistently leave an intelligent person in doubt as to whether they are communicating with a real person or an artificial personality) existing artificial personalities have been reported to elicit emotional responses from persons communicating with them.

Artificial personalities are believed to typically operate by eliciting response from a user, parsing those responses to identify groups of key words (herein sometimes "descriptors") which describe the subject, object, and relationship in the statement and reflecting that statement back to the user by incorporating all or part of the descriptor, with appropriate grammatical changes, into predetermined templates. For example (2 brief sessions with "eliza.html"):

Eliza: Hello. I am ELIZA. How can I help you?
User: I am unhappy in my job (work).
Eliza: Why do you say your job (work)?

The artificial personality can also communicate pseudo-factual declarative statements (e.g. "I am ELIZA.") and open-ended queries (e.g. How can I help you?) when it is unable to parse a response or to elicit further responses.

Figure 22:
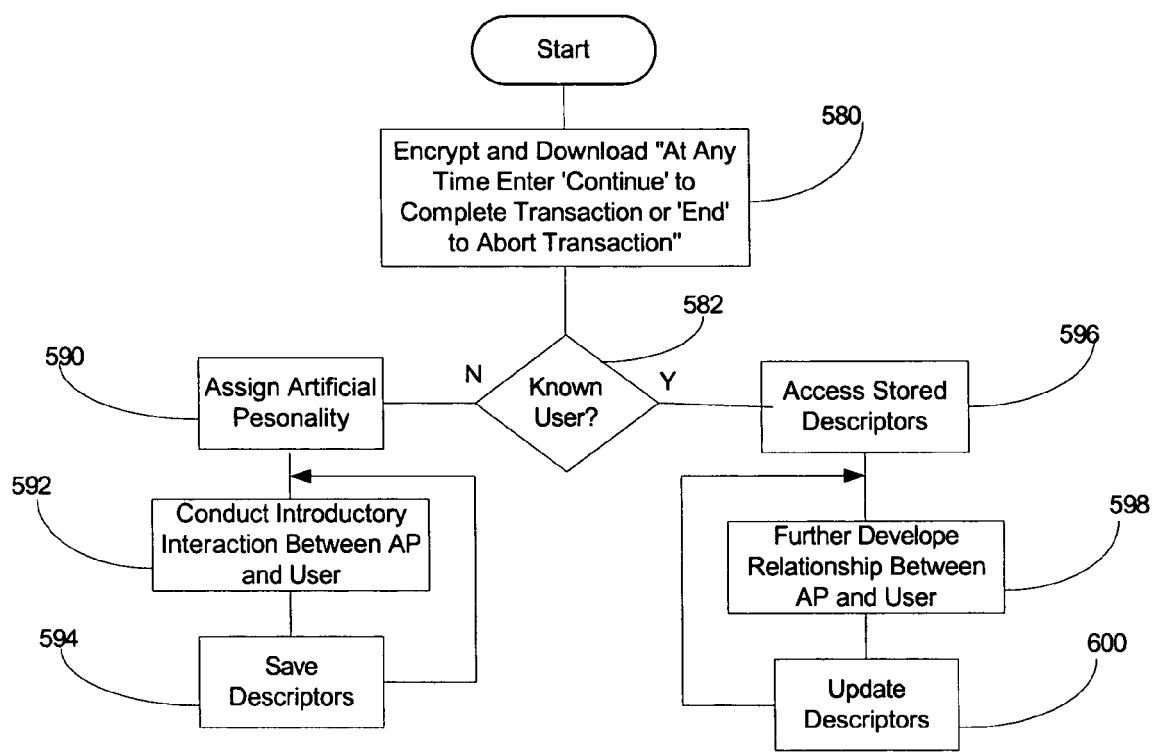
FIG. 22 shows a flow diagram of the operation of the server of FIG. 3 in establishing a relationship between an artificial personality maintained by the server of FIG. 3 and a second party.

Turning to FIG. 22 the operation of server 50 in establishing a relationship (as shown in FIG. 10) between a second party user and a selected artificial personality is shown. At step 580 the session or "conversation" between the user and the selected artificial personality is initiated by downloading a prompt to device 10. Note that the session continues until the user decides that he or she is confident about whether or not they are actually communicating with the trusted third party system. At step 582 server 50 determines if the user is known to the system. If not, at step 590 sever 50 selects an artificial personality from database 72. As described above record 72R contains reflector templates, pseudo-factual statements and open-end queries for a particular artificial personality. By varying the semantic content and the vocabulary of the elements stored in various records server 50 can execute a multiplicity of artificial personalities with a single routine. As will be described further below, as each user interacts with his or her selected artificial personality a record of shared information based on a unique relationship is developed so that communication with the selected artificial personality will provide the user with perceptible assurance that they are in fact communicating with the trusted third party system.

Then at step 592 server 50 conducts an introductory session with the user designed to elicit statements from the user which can then be parsed to generate descriptors, and at step 594 saves these descriptors in record 64R (shown in FIG. 3), together with the identity of the selected artificial personality. The session continues until the user decides to either continue with or abort the transaction.

Because the initial session will offer little assurance to a user who has "just met" the selected artificial personality it is anticipated that second party users will limit their initial few transactions to those having little or no risk until a relationship which provides sufficient assurance has developed. Alternatively, the trusted third party can provide potential second party users with an opportunity to conduct an initial session, not related to any transaction, from a secure telephone over the public switched network or through a secure web page; though this may require a one time password to link the initial session to the user's thumbprint or other biometric when device 10 is first used for a transaction. (While artificial personalities can also be used by first parties to verify that they are communicating with the trusted third party system, it is anticipated that this will generally not be necessary since an untrustworthy forth party will not have access to the first party's accounts and the third party will typically provide or control communications device 10.)

At step 582, if the user is known then at step 596 server 50 accesses the stored descriptors and at step 598 conducts a continuing session with the user and at step 600 updates the stored descriptors. These stored descriptors, together with the pseudo-factual statements that have been communicated to the user form a secure body of shared information which, as a relationship develops over time to provide an increasing assurance to the user that he or she is in fact communicating with the trusted third party system; even though communication may be through an insecure device such as a cell phone or PDA which does not belong to the user.

It is believed that more advanced techniques for developing artificial personalities are known to those skilled in the artificial intelligence art, or may be developed in the future. Work in this area is being done by the Gesture and Narrative Language Group of MIT Media Labs, the Center for Human Modeling And Simulation at the University of Pennsylvania, and Digital Life Technologies Group, Leiden Inst. of Advanced Computer Sciences, University of Leiden, P.O. Box 9512, 2300 RA Leiden, The Netherlands. Such advanced techniques may allow artificial personalities to do things such as make inside jokes, as about things on the user's to do list, or ask things like: "How is that car you bought working out?" The user and the artificial personality can have a shared vocabulary so that ambiguous phrases such as "my account" or "Jeff" will be recognized. Advanced artificial personalities can also have traits such as a particular sense of humor, or style; make pseudo-factual statements about hobbies, its schedule, etc.; may gradually change over time; and generally may more closely emulate an actual person with a complex, detailed life and so provide an increased level of assurance to users. In other embodiments of the subject invention advanced artificial personalities can apply similar considerations to users to assure that users are who they represent themselves to be.

Such advanced artificial personalities, whether presently known or later developed can easily be incorporated into embodiments of the subject invention by those skilled in the art as may be found to be convenient; and details of their implementation form no part of the present invention except as claimed below.

While use of an artificial personality has been described as carried out separately from other functions of the subject invention for simplicity of explanation those skilled in the art will recognize that in other embodiments all communications can be modified by the artificial personality so that the user constantly has a feeling of communicating with a known person. Artificial personalities also can be used to provide assurance to a user of other systems such as an online escrow system, so that a user wishing to make a payment to an escrow account can be sure that payment is not made to a false account.

In another embodiment of the subject invention the trusted third party system can authenticate itself to the user by responding with an agreed response, that only the user knows, when the user logs onto the system, e.g. when the user's thumbprint is recognized. The response can include something which changes with time such as the number, time or description of the previous transaction.

In another embodiment of the subject invention server 50 can be programmed to transfer funds or a copy of a document to a preselected account the next party to log on. (Of course server 50 goes to an appropriate error routine if the next party does not have an identified account.) Thus a first party can transfer something to a second party simply by passing them device 10, with the transfer taking place as the second party's thumbprint is recognized.

In another embodiment the trusted third party can submit to audits to prove that it has not retained any copies of transactions it handles; other then documents stored in individual accounts. Society thus has less privacy risks because the documents are not stored in any one place.

In another embodiment device 10 can incorporate a communications link such as the commercially available bluetooth chip and communicate through a cellular telephone which would relay transmission to the trusted third party system. In this embodiment, provided the user has some way to be identified through the cellular phone, e.g. a password.

In another embodiment the subject invention is adapted to deal with exchange rates. Device 10 is modified to have two thumbprint readers, one labeled "sender" and the other labeled "receiver". A transaction occurs when both thumbprints are recognized. The sender can then have the option to fix the transaction amount in terms of a second currency. Device 10 then displays both that the transferred funds met the price at the time the transaction occurred and the current worth in terms of a fluctuating exchange rate. By delaying when they identify themselves the recipient may wait for the amount transferred to exceed the original price; though the sender pays no more in terms of the second currency. If the sender is buying something priced in a foreign currency once the sender enters the price in the foreign currency device 10 displays the fluctuating amount in terms of the sender's currency and the sender can wait for this amount to reach what sender considers to be a low. If the recipient wishes to wait a long time before converting the amount into his or her currency the fund s can be held in escrow.

In another embodiment, server 50 can be programmed so that a user can borrow one or more devices 10 from other parties and use each of these devices to confirm a transaction the user has made on a different device 10 to guard against the possibility the device 10 used has been tampered with.

The embodiments described above and illustrated in the attached drawings have been given by way of example and illustration only. From the teachings of the present application those skilled in the art will readily recognize numerous other embodiments in accordance with the subject invention. Particularly, a third party in accordance with the subject invention does not have to be a monolithic organization. A plurality of associated entities who can exchange information and who have established trust among themselves (either in accordance with the present invention or in any other convenient manner) can act as the third party. Thus, in such an embodiment, parties to a transaction would only need to communicate with a particular entity with whom they had established trust yet would receive the assurance needed to carry out the transaction from the "third party" formed by the associated entities. Accordingly, limitations on the subject invention are to be found only in the claims set forth below.

What is claimed is:

1. A method for facilitating a transaction between a first party and a second party, said method comprising the steps of:
    a) a remotely located system, which is controlled by a trusted third party, receives said first party's instructions for fulfilling at least a part of said first party's obligations in said transaction;
    b) said trusted third party system communicating with said second party by producing physical features of a device or signals produced by the device which provides said second party with a artificial personality of said trusted third party so that said second party will recognize physical features of the device, or signals produced by the device to have a perceptible assurance that said second party will recognize the artificial personality of said trusted third party when said second party is in communication with said trusted third party system; and
    c) transmitting information to said second party to provide assurance that said first party's instructions have been or will be fulfilled; whereby
    d) the artificial personality of said third party is transferred to said second party so that said second party will trust that said first party's obligations have been or will be fulfilled.

2. A method as described in claim 1 where said first party transmits said instructions to said trusted third party system through a portable communications device which is one of a plurality of essentially functionally identical communications devices, whereby said first party can use any of said plurality of devices to transmit said instructions.

3. A method as described in claim 2 where said trusted third party system transmits said information to said second party through said portable communications device.

4. A method as described in claim 3 where said plurality of devices all have perceptible features which are difficult to reproduce, and are all tamper resistant to provide said perceptible assurance, whereby said second party perceptible assurance that said portable communications device is an authorized device and that said information provided by said trusted third party system is authentic.

5. A method as described in claim 4 where said perceptible features of said portable communications device include at least one of: special materials used in its construction, patterns etched or otherwise affixed to its surface, fibers or particles embedded in its surface, holograms, or a unique form.

6. A method as described in claim 4 where said perceptible features of said portable communications device includes a perceptible signal representative of information shared by said trusted third party system and said second party.

7. A method as described in claim 6 where said shared information is based upon a pattern of information exchanged by said trusted third party system and said second party during the development of a relationship.

8. A method as described in claim 7 where said shared information is modified and structured by an artificial personality program, whereby characteristics of the transmitted information produced by said program provide said second party with said perceptible assurance that said second party is in communication with said trusted third party system.

9. A method as described in claim 1 where said information transmitted by said trusted third party system is modified and structured by an artificial personality program, whereby characteristics of the transmitted information produced by said program provide said second party with said perceptible assurance that said second party is in communication with said trusted third party system.

10. A method as described in claim 1 where said first party's obligations in said transaction include payment to said second party.

11. A method as described in claim 10 where said first party transmits instructions to said trusted third party system to make said payment from a first party account.

12. A method as described in claim 11 where said instructions include instructions to select said first party account from a plurality of accounts.

13. A method as described in claim 12 where said plurality of accounts includes at least one of: an account maintained with said trusted third party, a bank account, a credit card account, or an account with a payment service.

14. A method as described in claim 10 comprising the further step of said second party providing instructions to said third party directing how said payment is to be made.

15. A method as described in claim 10 where said second party can provide instructions that said payment be made to an account maintained with said trusted third party.

16. A method as described in claim 1 where said first party's obligations in said transaction include providing a copy of a document to said second party.

17. A method as described in claim 16 where said document has been previously stored with said trusted third party system and said trusted third party system transmits said document to said second party.

18. A method as described in claim 16 where said trusted third party system digitally signs said document on behalf of said first party.

19. A method as described in claim 18 where said document is one of: a receipt, an offer, an acceptance, or a check.

20. A method as described in claim 16 where said document is an identification document.

21. A method as described in claim 16 comprising the further step of said second party providing instructions to said third party directing how said document is to be delivered.

22. A method as described in claim 16 where said first party transmits instructions to said trusted third party system, said instructions at least partly specifying the contents of said document.

23. A method as described in claim 1 where a party maintains an account with a trusted third party and said party can access said trusted third party system to review said account.

24. A method as described in claim 1 where said second party is a vendor with whom said trusted third party has established a relationship and said transaction is a purchase by said first party from said second party.

25. A method as described in claim 1 comprising the further step of said third party system saving a record of said transaction for later use in case of a dispute.

26. The method claimed in claim 1, wherein said artificial personality of said trusted third party elicits responses from said second party.

27. The method claimed in claim 1, wherein the physical features of the device or signals produced by the device are directly perceived by said second party, either from the device itself or when the device is used, without the use or encryption technology.

28. A programmable system controlled by a trusted third party for facilitating a transaction between a first party and a second party, said system being programmed to:
 a) receive said first party's instructions for fulfilling at least a part of said first party's obligations in said transaction;
 b) communicate with said second party by providing said second party physical features of a device or signals produced by the device to provide a artificial personality of said trusted third party so that said second party will recognize physical features of the device or signals produced by the device to have a perceptible assurance that said second party will recognize the artificial personality of said trusted third party when said second party is in communication with said trusted third party system; and
 c) transmit information to said second party to provide assurance that said first party's instructions have been or will be fulfilled; whereby
 d) the artificial personality of said third party is transferred to said second party so that second party will trust that said first party's obligations have been or will be fulfilled.

29. A system as described in claim 28 where said first party transmits said instructions to said trusted third party system through a portable communications device which is one of a plurality of essentially functionally identical communications devices, whereby said first party can use any of said plurality of devices to transmit said instructions, and said system is further programmed to test each input received to determine if said inputs are received from an authorized and uncorrupted one of said devices.

30. A system as described in claim 28 where said system is further programmed to provide said perceptible assurance by communicating shared information based upon a pattern of information exchanged by said trusted third party system and said second party during the development of a relationship to said second party.

31. A system as described in claim 30 where said system is further programmed with an artificial personality program to modify and structure said shared information, whereby characteristics of the transmitted information produced by said program provide said second party with said perceptible assurance that said second party is in communication with said trusted third party system.

32. A system as described in claim 28 where said first party's obligations in said transaction include payment to said second party and said instructions to said system are to make said payment from a first party account.

33. A system as described in claim 32 where said instructions include instructions to select said first party account from a plurality of accounts, said plurality of accounts including at least one of: an account maintained with said trusted third party, a bank account, a credit card account, or an account with a payment service.

34. A system as described in claim 28 where said system is further programmed to receive instructions from said second party directing how said payment is to be made.

35. A system as described in claim 28 where said first party's obligations in said transaction include providing a copy of a document to said second party and said instructions to said system are to transmit said document to said second party.

36. A system as described in claim 35 where said document has been previously stored in said system.

37. A system as described in claim 35 where said system is further programmed to digitally sign said document on behalf of said first party.

38. A system as described in claim 37 where said system is further programmed to receive instructions from said second party directing how said document is to be delivered.

39. A system as described in claim 38 where said system is further programmed to receive further instructions from said first party, said further instructions at least partly specifying the contents of said document.

40. The system claimed in claim 28, wherein the physical features of the device or signals produced by the device are directly perceived by said second party, either from the device itself or when the device is used, without the use or encryption technology.

41. The method claimed in claim 28, wherein said artificial personality of said trusted third party elicits responses from said second party.

42. A portable communications system, which is one of a plurality of essentially functionally identical communications devices for communicating with a trusted third party system, where said plurality of devices all have perceptible physical features produced by a device which are difficult to reproduce, and are all tamper resistant, so as to provide perceptible physical features of the device to provide assurance that said portable communications device is an authorized device and that said information provided by said trusted third party system is authentic.

43. A portable communications device as described in claim 42 where said perceptible features include at least one of: special materials used in its construction, patterns etched or otherwise affixed to its surface, fibers or particles embedded in its surface, holograms, or a unique form.

44. A portable communications device as described in claim 42 where said perceptible features include a perceptible signal representative of information shared by said trusted third party system and said second party.

45. A portable communications device as described in claim 42 further comprising a tamper-detecting system for detecting attempts to tamper with said device, and for communicating with said third party system if an attempt to tamper is detected.

46. The system claimed in claim 42, wherein the physical features of the device or signals produced by the device and directly perceived by said second party, either from the device itself or when the device is used, without the use or encryption technology.

47. A computer readable medium for providing program code for execution by a trusted third party system, said system being responsive to said program code to:
  a) receive said first party's instructions for fulfilling at least a part of said first party's obligations in a transaction;
  b) communicate with said second party by producing physical features of a device or signals produced by the device to provide said second party with a artificial personality of said trusted third party so that said second party will recognize physical features of the device or signals produced by the device to have a perceptible assurance that said second party will recognize the artificial personality of said trusted third party when said second party is in communication with said trusted third party system; and
  c) transmit information regarding the artificial personality of said trusted third party to said second party to provide assurance that said first party's instructions have been or will be fulfilled.

48. The method claimed in claim 47, wherein said artificial personality of said trusted third party elicits responses from said second party.

49. The system claimed in claim 47, wherein the physical features of the device or signals produced by the device are directly perceived by said second party, either from the device itself or when the device is used, without the use or encryption technology.

* * * * *